US012651750B2

(12) United States Patent
Chang et al.

(10) Patent No.: US 12,651,750 B2
(45) Date of Patent: Jun. 9, 2026

(54) ANODE INTERLAYER, PREPARATION METHOD THEREOF, ANODE FOR SECONDARY BATTERY, AND SECONDARY BATTERY INCLUDING THE ANODE

(71) Applicants: Samsung Electronics Co., Ltd.;
Industry-Academic Cooperation Foundation, Yonsei University, Seoul (KR)

(72) Inventors: Wonseok Chang, Seoul (KR); Jong Hyeok Park, Seoul (KR); Seungsik Hwang, Seongnam-si (KR); Jusik Kim, Hwaseong-si (KR)

(73) Assignees: SAMSUNG ELECTRONICS CO., LTD., Gyeonggi-Do (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 720 days.

(21) Appl. No.: 17/966,989

(22) Filed: Oct. 17, 2022

(65) Prior Publication Data

US 2023/0137721 A1     May 4, 2023

(30) Foreign Application Priority Data

Nov. 1, 2021     (KR) ........................ 10-2021-0148127

(51) Int. Cl.
H01M 4/62 (2006.01)
H01M 4/02 (2006.01)
(Continued)

(52) U.S. Cl.
CPC ........... H01M 4/62 (2013.01); H01M 4/0402 (2013.01); H01M 4/134 (2013.01);
(Continued)

(58) Field of Classification Search
CPC ... H01M 2004/021; H01M 2300/0068; H01M 4/13; H01M 4/131; H01M 4/1393;
(Continued)

(56) References Cited

U.S. PATENT DOCUMENTS 6,402,795 B1     6/2002   Chu et al.
6,485,622 B1     11/2002  Fu et al.
(Continued)

FOREIGN PATENT DOCUMENTS

JP     2020180376 A     11/2020
KR     20180036600 A     4/2018
(Continued)

OTHER PUBLICATIONS

Matsuyama et al.; JP 2020-180376; Espacenet machine translation, 2020 (Year: 2020).*
(Continued)

*Primary Examiner* — Adam A Arciero
(74) *Attorney, Agent, or Firm* — CANTOR COLBURN LLP

(57)     ABSTRACT

An anode interlayer including a composite, the composite including: a first metal having electrochemical reactivity to lithium; and a second metal having no electrochemical reactivity to lithium, wherein the second metal has a non-spherical structure, and the first metal is disposed on at least one surface of the second metal.

32 Claims, 13 Drawing Sheets

(51) Int. Cl.

| | | |
|---|---|---|
| *H01M 4/04* | (2006.01) | |
| *H01M 4/134* | (2010.01) | |
| *H01M 10/0525* | (2010.01) | |
| *H01M 10/0562* | (2010.01) | |
| *H01M 10/0585* | (2010.01) | |

(52) U.S. Cl.
CPC ... *H01M 10/0525* (2013.01); *H01M 10/0562* (2013.01); *H01M 10/0585* (2013.01); *H01M 2004/027* (2013.01); *H01M 2300/0071* (2013.01)

(58) Field of Classification Search
CPC ...... H01M 4/362; H01M 4/364; H01M 4/366; H01M 4/587; H01M 4/133; H01M 4/1395; H01M 4/38; H01M 4/382; H01M 4/386; H01M 4/387; H01M 4/405; H01M 4/485; H01M 4/625; H01M 4/626; H01M 4/661; H01M 10/052; H01M 10/0565
See application file for complete search history.

(56) References Cited

U.S. PATENT DOCUMENTS

| | | | |
|---|---|---|---|
| 7,273,682 | B2 | 9/2007 | Park et al. |
| 7,901,658 | B2 | 3/2011 | Weppner et al. |
| 7,914,932 | B2 | 3/2011 | Yoshida et al. |
| 8,828,580 | B2 | 9/2014 | Visco et al. |
| 8,865,355 | B2 | 10/2014 | Yasutoshi et al. |
| 9,034,524 | B2 | 5/2015 | Moon et al. |
| 9,531,036 | B2 | 12/2016 | Ohta et al. |
| 9,559,396 | B2 | 1/2017 | Lee et al. |
| 9,761,905 | B2 | 9/2017 | Eisele et al. |
| 9,859,559 | B2 | 1/2018 | Kim et al. |
| 10,033,066 | B2 | 7/2018 | Nemori et al. |
| 10,109,851 | B2 | 10/2018 | Song et al. |
| 10,128,533 | B2 | 11/2018 | Yamamoto et al. |
| 10,135,084 | B2 | 11/2018 | Lee et al. |
| 10,168,389 | B2 | 1/2019 | Fujiki et al. |
| 10,985,407 | B2 | 4/2021 | Suzuki et al. |
| 2016/0164138 | A1 | 6/2016 | Han et al. |
| 2017/0025705 | A1 | 1/2017 | Miara et al. |
| 2017/0301957 | A1* | 10/2017 | Park .................. H01M 10/0436 |
| 2018/0006326 | A1 | 1/2018 | O'Neill et al. |
| 2018/0123167 | A1 | 5/2018 | Yi et al. |
| 2018/0123181 | A1 | 5/2018 | Son et al. |
| 2018/0151884 | A1* | 5/2018 | Yushin .................. H01M 4/134 |
| 2018/0205112 | A1 | 7/2018 | Thomas-Alyea et al. |

| | | | |
|---|---|---|---|
| 2018/0301693 | A1 | 10/2018 | Choi et al. |
| 2018/0301754 | A1 | 10/2018 | Badding et al. |
| 2019/0044137 | A1 | 2/2019 | Zhamu et al. |
| 2019/0044186 | A1 | 2/2019 | Kim et al. |
| 2019/0088993 | A1 | 3/2019 | Ohta |
| 2019/0207252 | A1 | 7/2019 | Badding et al. |
| 2019/0393505 | A1 | 12/2019 | Suzuki et al. |
| 2020/0006806 | A1 | 1/2020 | Allenic et al. |
| 2020/0270143 | A1 | 8/2020 | Ohta et al. |
| 2020/0328459 | A1 | 10/2020 | Sakai et al. |
| 2020/0328465 | A1 | 10/2020 | Sakaida et al. |
| 2020/0403267 | A1 | 12/2020 | Li et al. |
| 2021/0043966 | A1 | 2/2021 | Gwon et al. |
| 2021/0098825 | A1 | 4/2021 | Sakaida et al. |
| 2021/0242495 | A1 | 8/2021 | Kim et al. |
| 2021/0257606 | A1 | 8/2021 | Kim et al. |
| 2021/0344082 | A1* | 11/2021 | Beck ..................... H01M 50/46 |
| 2021/0376378 | A1 | 12/2021 | Jung et al. |

FOREIGN PATENT DOCUMENTS

| | | | | |
|---|---|---|---|---|
| KR | 20180046693 | A | 5/2018 | |
| KR | 20190050226 | A | 5/2019 | |
| KR | 101991964 | B1 | 6/2019 | |
| KR | 102012414 | B1 | 8/2019 | |
| KR | 20190130307 | A | 11/2019 | |
| KR | 20200028165 | A | 3/2020 | |
| KR | 20210071610 | A * | 6/2021 | .......... H01M 4/0435 |
| KR | 20210105286 | A | 8/2021 | |
| KR | 20210149619 | A | 12/2021 | |
| KR | 102431358 | B1 * | 8/2022 | |
| WO | 2019135319 | A1 | 7/2019 | |
| WO | 2020070956 | A1 | 4/2020 | |
| WO | 2020072524 | A1 | 4/2020 | |
| WO | 202020176905 | A1 | 9/2020 | |
| WO | 2020220042 | A1 | 10/2020 | |

OTHER PUBLICATIONS

Lee et al., KR 102431358-B1, Espacenet machine translation, 2019 (Year: 2022).*

Lee et al., KR-20210071610-A, Espacenet machine translation, 2021 (Year: 2021).*

Yong-Gun Lee et al., "High-energy long-cycling all-solid-state lithium metal batteries enabled by silver-carbon composite anodes," Nature Energy, Apr. 2020, pp. 299-308, 10 pps.

Office Action dated Jan. 27, 2026, in correspondence to KR Patent Application No. 10-2021-0148127 with English Translation, 16 pp.

* cited by examiner

EDS Layered Image 4

1 µm

Ag L series

1μm

Cu L series

1μm

Electron Image 5

10μm

Electron Image 2

Ag Lα1

25µm

C Kα1_2

25µm

ANODE INTERLAYER, PREPARATION METHOD THEREOF, ANODE FOR SECONDARY BATTERY, AND SECONDARY BATTERY INCLUDING THE ANODE

CROSS-REFERENCE TO RELATED APPLICATION

This application is based on and claims priority to Korean Patent Application No. 10-2021-0148127, filed on Nov. 1, 2021, in the Korean Intellectual Property Office, and all the benefits accruing therefrom under 35 U.S.C. § 119, the content of which in its entirety is herein incorporated by reference.

BACKGROUND

1. Field

The present disclosure relates to an anode interlayer, preparation methods thereof, an anode for a secondary battery, and the secondary battery including the anode.

2. Description of the Related Art

Recently, batteries with high energy density and excellent safety have been actively developed in response to industrial demands. For example, lithium ion batteries are being put to practical use not only in the fields of information-related devices and communication devices, but also in the fields of automobiles. In the fields of automobiles, safety is considered to be especially important to avoid injury or loss of life.

Lithium ion batteries currently available on the market use an electrolytic solution containing a flammable organic solvent, and thus overheating and fire may occur in the case of a short circuit. In this regard, all-solid-state secondary batteries using a solid electrolyte instead of an electrolytic solution are being proposed.

All-solid-state secondary batteries do not use a flammable organic solvent, and thus the possibility of fire or explosion may be greatly reduced even in the case of a short circuit. Therefore, all-solid-state secondary batteries may have significantly increased stability compared to lithium ion batteries using an electrolytic solution. Nonetheless, there remains a need for improved battery materials.

SUMMARY

Provided is an anode interlayer and preparation method thereof.

Provided is an anode including the anode interlayer for a secondary battery.

Provided is a secondary battery including the anode, wherein metal migration is minimized in the interlayer during high-rate charge and discharge, thereby improving lifespan characteristics and high-rate output characteristics.

Additional aspects will be set forth in part in the description, which follows and, in part, will be apparent from the description, or may be learned by practice of the presented embodiments of the disclosure.

According to an aspect of an embodiment, an anode interlayer includes a composite, the composite including: a first metal having electrochemical reactivity to lithium and a second metal having no electrochemical reactivity to lithium, wherein the second metal has a non-spherical structure, and the first metal is disposed on at least one surface of the second metal.

The second metal may be in a form of a needle, a nanowire, a nanotube, a nanorod, a wafer, a nanoribbon, a nanofiber, an ellipse, a polyhedron, or a combination thereof, and the first metal may be in a form of a nanoparticle, a needle, a nanowire, a nanotube, a nanorod, a wafer, a nanoribbon, an ellipse, a polyhedron, or a combination thereof.

The composite may include the first metal and the second metal, wherein the first metal is in the form of a nanoparticle, a needle, a nanorod, or a combination thereof, and is disposed on the second metal, wherein the second metal is in the form of a nanowire, a nanorod, a needle, or a combination thereof.

According to an aspect, an anode for a secondary battery includes: an anode current collector; and the anode interlayer on the current collector.

The anode may further include a first anode active material layer between the anode current collector and the anode interlayer, and the first anode active material layer may include a lithium metal, a lithium alloy, or a combination thereof.

According to an aspect of another embodiment, a secondary battery includes: a cathode layer including a cathode active material; an anode layer; and a solid electrolyte layer including a solid electrolyte and disposed between the cathode layer and the anode layer, wherein the anode layer includes the anode.

The first metal may be uniformly present in an entire region of the anode interlayer.

The anode current collector, the anode interlayer, and a region therebetween may be lithium (Li)-free regions that do not include Li.

According to an aspect of another embodiment, a method of preparing the anode interlayer includes: providing a first metal having electrochemical reactivity to lithium, providing a second metal having no electrochemical reactivity to lithium, wherein the second metal is in a form of a non-spherical structure; disposing the first metal on the second metal to prepare a composite; contacting the composite and a binder and a solvent to form a slurry, coating the slurry comprising the composite and a binder on a substrate to form a coated substrate; drying the coated substrate; and removing the substrate to prepare the anode interlayer.

The method may further include, after the disposing of the first metal on the second metal to prepare the composite, contacting the composite with a carbonaceous material.

The disposing of the first metal on the second metal to form the composite may be performed by a galvanic replacement reaction by contacting the second metal with an electrolytic solution containing a first metal precursor, and reducing the first metal precursor on a surface of the second metal to form the composite.

The disposing of the first metal on the second metal to provide the composite may further include ultrasonicating a mixture of the composite in an alcohol, water, or a combination thereof, and vacuum-drying the mixture to form a washed composite. In addition, the ultrasonicating of the mixture may further include forming a dispersion of the mixture of the composite in the alcohol, water, or a combination thereof.

Also disclosed is an anode interlayer including a composite, the composite including: a first metal having electrochemical reactivity to lithium and a second metal having no electrochemical reactivity to lithium, wherein the first metal is disposed on a surface of the second metal, and wherein the first metal has an aspect ratio that is the same or less than an aspect ratio of the second metal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figures 1A, 1B:
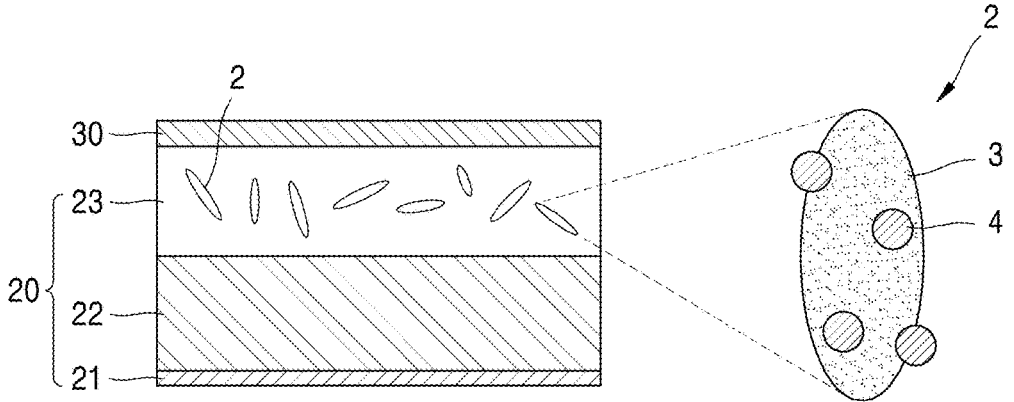
FIG. 1A is a cross-sectional diagram schematically illustrating an embodiment of a structure in which an interlayer including a composite is arranged between a lithium anode and a solid electrolyte.
FIG. 1B is an illustration of an embodiment of a composite.

Reference will now be made in detail to embodiments, examples of which are illustrated in the accompanying drawings, wherein like reference numerals refer to like elements throughout the specification. In this regard, the present embodiments may have different forms and should not be construed as being limited to the descriptions set forth herein. Accordingly, the embodiments are merely described below, by referring to the figures, to explain various aspects. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the same associated listed items. Expressions such as "at least one of," when preceding a list of elements, modify the entire list of elements and do not modify the individual elements of the list.

Hereinafter, an anode interlayer including a composite according to an embodiment, a preparation method thereof, an anode for a secondary battery, and a secondary battery including the anode will be described in more detail with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

An average particle diameter (e.g., particle size) may be, for example, a median diameter (D50) measured using a laser particle size distribution meter, e.g., by laser light diffraction.

An aspect of the present disclosure provides an anode interlayer including a composite that includes a first metal having electrochemical reactivity to lithium and a second metal having no electrochemical reactivity to lithium, wherein the second metal has a non-spherical structure, and the first metal is disposed on at least one surface of the second metal.

In an all-solid-state secondary battery in which a solid electrolyte is used, lithium can be locally deposited on an interface between a solid electrolyte layer and an anode layer. While not wanting to be bound by theory, it is understood that the deposited lithium dendrites grow and consequently penetrate the solid electrolyte layer, resulting in a short circuit of the battery.

To solve this problem, a method of positioning a carbon and a metal alloyable with lithium, such as silver, in an interlayer between a solid electrolyte and an anode layer has been proposed. However, when this method is used, silver is understood to irreversibly diffuse towards a current collector during a charge process. While not wanting to be bound by theory, it is understood that a short circuit may occur at an interface of an anode layer and a solid electrolyte due to anode delamination caused by void formation or dendrite growth resulting from by current concentration. Accordingly, lifespan characteristics and high-rate output characteristics of batteries may be degraded.

Figure 2:
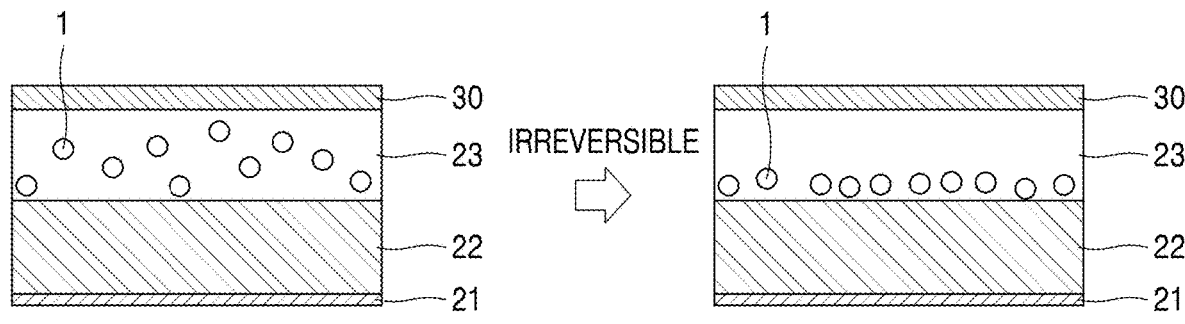
FIG. 2 shows an irreversible migration of a first metal in an interlayer during a charge process between a lithium anode and a solid electrolyte.

To solve problems of growth of lithium dendrites occurring between a lithium anode and a solid electrolyte in an all-solid-state secondary battery, as shown in FIG. 2, a method of arranging an interlayer 23 between a first anode active material layer 22, e.g., a lithium anode, and a solid electrolyte 30 has been suggested, wherein the interlayer 23 includes a first metal 1, such as silver (Ag), which is a metal alloyable with lithium, and a carbon. According to the suggested method, Ag, which is a metal alloyable with lithium, undergoes an irreversible reaction during a charge process, so that the first metal 1 diffuses toward a current collector 21. This process is understood to be irreversible, thus Ag does not recover to an original position even if the charge process proceeds in a reversible way. Thus, in an area where Ag content is insufficient, ion or electron conductivity can be reduced, and while not wanting to be bound by theory, it is understood that a short circuit may occur due to anode delamination by void formation at an interface, or by dendrite growth from current concentration. As a result, lifespan characteristics and high-rate output characteristics of a battery may be degraded.

In this regard, to suppress the migration and diffusion of the first metal, such as Ag, the inventors of the present disclosure have surprisingly discovered improved effects when using an anode interlayer including a composite in which the first metal is combined with a second metal having no electrochemical reactivity to lithium, and the second metal has a different aspect ratio than an aspect ratio of the first metal.

Here, the second metal may have an aspect ratio that is greater than the aspect ratio of the first metal. In an aspect, the second metal may have an aspect ratio that is the same or greater than the aspect ratio of the first metal.

The term "aspect ratio" as used herein refers to a length of a particle divided by a diameter (width). The diameter refers to a minor axis length of the particle, and the length refers to a major axis length of the particle.

The diameter and the length may refer to, for example, an average diameter and an average length, respectively. The average diameter and the average length may represent an average value of the measured diameters and an average value of the measured lengths, respectively.

The aspect ratio may be an average value of the aspect ratios in a sample, wherein the sample may be the first metal or the second metal.

For example, when the sample has a needle-like shape, the term "aspect ratio" refers to a ratio of a major axis length to a minor axis length (i.e., length of the major axis/length of the short axis).

The composite according to an embodiment may further include a carbon-based material, i.e., a carbonaceous material. When the composite includes a carbon-based material, the first metal and the second metal may be uniformly distributed in a carbon matrix comprising the carbon-based material. An amount of the carbon-based material may be in a range of about 50 parts by weight to about 97 parts by weight, about 50 parts by weight to about 80 parts by weight, or about 60 parts by weight to about 74 parts by weight, based on 100 parts by weight of a total weight of the composite. When the amount of the carbon-based material is within these ranges, a secondary battery having improved high-rate charge and discharge characteristics may be prepared.

The composite may include the first metal having electrochemical reactivity to lithium and the second metal having no electrochemical reactivity to lithium. In an aspect, the second metal has a non-spherical structure, and the first metal is arranged on at least one surface of the second metal.

The first metal may be bonded to at least one surface of the second metal.

In an embodiment, when the first metal is present on the surface of the second metal, the first metal may have a coverage of about 20 percent (%) or less, for example, about 5% to about 20%, about 8% to about 18%, or about 10% to about 15%. Here, the coverage refers to a percentage of the surface area of the second metal occupied by the first metal based on the total surface area of the second metal. In an aspect, coverage can be a percentage of a total surface area of the second metal contacted by the first metal. In another aspect, coverage can be a percentage of a total surface are of the second metal occluded by the first metal.

In the composite according to an embodiment, an amount of the first metal may be, in a range of about 10 parts by weight to about 30 parts by weight, or about 15 parts by weight to about 25 parts by weight, based on 100 parts by weight of the total weight of the first metal and the second metal. Here, a weight ratio of the first metal to the second metal may be in a range of about 1:2 to about 1:10, about 1:2.3 to about 1:9, about 1:3 to about 1:8, or about 1:4 to about 1:6. When the amount of the first metal is within these ranges, the first metal may be uniformly distributed in the interlayer so that aggregation of particles of the first metal may be suppressed, thereby avoiding fluidity of the particles of the first metal. As a result, the migration of the first metal toward a current collector may be effectively prevented during a charge and discharge process, thereby improving charge and discharge characteristics at high current density.

Here, the amounts of the first metal and the second metal in the composite may be confirmed by energy dispersive X-ray spectroscopy (EDS) analysis.

When the composite according to one or more embodiments includes a carbon-based material, the amount of the first metal may be about 5 parts by weight or less, or in a range of about 1 part by weight to about 5 parts by weight, about 1.5 parts by weight to about 4 parts by weight, or about 2 parts by weight to about 3 parts by weight, based on 100 parts by weight of the total weight of the composite (e.g., 100 parts by weight of the total weight of the first metal, the second metal, and the carbon-based material). Since the discharge output characteristics may be improved while the first metal, such as expensive silver, is included in the relative amount of about 5 weight percent (wt %) or less in the composite, the amount of silver may be significantly reduced compared to the amount of silver (e.g., about 20 wt %) in a silver-carbon composite of the related art. Accordingly, when the interlayer including the composite is used, the manufacturing cost of the secondary battery may be reduced.

The second metal may be in a form of a needle, a nanowire, a nanotube, a nanorod, a wafer, a nanoribbon, an ellipse, a polyhedron, or a combination thereof. In addition, the first metal may be in a form of a nanoparticle, a needle, a nanowire, a nanotube, a nanorod, a wafer, a nanoribbon, an ellipse, a polyhedron, or a combination thereof.

A ratio of the aspect ratio of the first metal to the second metal may be in a range of about 1:20 to about 1:200, about 1:30 to about 1:200, about 1:40 to about 1:200, about 1:50 to about 1:200, about 1:50 to about 1:180, or about 1:50 to about 1:150. When the first metal and the second metal have the aforementioned ratio of aspect ratios, an interlayer and an anode that have improved current uniformity may be prepared.

In a secondary battery according to an embodiment, the first metal may be uniformly present in an entire region of the anode interlayer after charge and discharge.

The distribution of the first metal may be confirmed by scanning electron microscopy (SEM) analysis after the secondary battery is charged and discharged. In a cross-sectional image of the anode interlayer obtained by SEM analysis after the secondary battery is charged and discharged at 0.5C rate more than 10 times, aggregation of the first metal, such as Ag, is not observed.

Hereinafter, the anode interlayer according to an embodiment will be further described with reference to the accompanying drawings.

Referring to FIG. 1A, an anode 20 is arranged adjacent to a solid electrolyte 30. In addition, the anode 20 includes an anode current collector 21 and a lithium anode that is a first anode active material layer 22 arranged on the anode current collector 21. In addition, an anode interlayer 23 according to an embodiment is arranged on the first anode active material layer 22. As shown in FIG. 1B, the interlayer 23 includes a composite 2 including a second metal 3, which has a non-spherical structure, and a first metal 4 arranged on the second metal 3.

In FIG. 1B, the second metal 3 is shown as, for example, a nanowire type, but may be a non-spherical structure in a form of a nanorod, a needle, nanotube, or a nanoribbon. A combination comprising at least one of the foregoing forms may be used. The second metal 3 may be, for example, a nanowire having an average diameter in a range of about 200 nanometers (nm) to about 300 nm, or about 225 nanometers (nm) to about 275 nm, and an average length in a range of about 1,000 nm to about 3,000 nm, or about 1500 nm to about 2500 nm. In addition, the first metal 4 may be, for example, in a form of a needle. The first metal may have an average major axis length in a range of about 100 nm to about 300 nm, or about 150 nm to about 250 nm, and an average minor axis length in a range of about 10 nm to about 50 nm, or about 20 nm to about 40 nm.

In FIG. 1B, the first metal 4 is shown as, for example, a nanoparticle type, but may be a non-spherical structure, and may be in the form of a nanorod, a needle, a nanowire, or a nanoribbon. A combination comprising at least one of the foregoing forms may be used. The first metal may be present in an amount to provide a coverage in a range of, for example, about 5% to about 20% of a total surface area of the second metal. In the present specification, the term coverage may refer to an area occupied by the first metal, based on the total surface area of the second metal. Coverage may be determined by SEM, for example.

The first metal 4 having electrochemical reactivity to lithium is a metal alloyable with lithium, and may include, for example, silver, gold, silicon, tin, germanium, indium, magnesium, aluminum, antimony, bismuth, or a combination thereof.

The second metal 3 having no electrochemical reactivity to lithium is a metal that is not electrochemically alloyable with lithium, and may include, for example, copper, nickel, titanium, tungsten, iron, or a combination thereof. In an aspect, the second metal 3 having no electrochemical reactivity to lithium is a metal that does not galvanically react when contacted with lithium.

As shown in FIG. 1A, the first metal 4 may be bonded to the second metal 3 having a non-spherical structure. In this regard, the second metal 3 may be used as a scaffold that serves to prevent the first metal 4 from migrating toward the anode current collector 21 during charge and discharge. In particular, the second metal 3, which is a metal not electrochemically alloyable with lithium, does not diffuse toward the current collector even when a high-rate charge and discharge process is performed. When such a composite is used, the composite may be uniformly distributed in the interlayer to improve non-uniformity of current of the interlayer, so that a secondary battery having improved lifespan characteristics and output characteristics may be provided.

The first metal 4 may have a face-centered cubic (FCC) crystal structure. As such, and while not wanting to be bound by theory, it is understood that when the first metal has an FCC crystal structure, the composite deforms less because a slip mechanism is facilitated for the first metal having an FCC crystal structure, compared to other crystal structures. Thus, continuous cracking and re-aggregation, which can be a disadvantage of nano-sized metal particles used for lithium secondary batteries, may be suppressed.

The first metal 4 may be provided by a galvanic replacement reaction. The term "galvanic replacement reaction" as used herein refers to a reaction in which, when a metal ion having a relatively high reduction potential and a metal having a relatively low reduction potential contact in a solution phase, via a stoichiometric reaction, the metal ion having a relatively high reduction potential is reduced (metalized), and the metal having a relatively low reduction potential is oxidized (ionized) so that the metal ion having a high reduction potential is disposed in the form of a metal.

The first metal 4 may have a greater reduction voltage (vs. standard hydrogen electrode (SHE)) than that of the second metal 3. The first metal may have a reduction potential in a range of about 0.7 volts (V) to about 0.9 V vs. SHE, or about 0.75 V to about 0.85 V vs. SHE, or may be about 0.8 V vs. SHE, and the second metal may have a reduction voltage of about −2.4 V to about 0.7 V vs. SHE, or about −2 V to about 0.6 V vs. SHE, or in a range of about −2.4 V to about 0.69 V vs. SHE. When the first metal has a greater reduction voltage than that of the second metal, the first metal 4 may be galvanically substituted under the reducing voltage conditions for the second metal 3.

In the composite 2, the first metal 4 may be silver, the second metal may be copper, and the silver as the first metal may be bonded to at least one surface of the copper as the second metal. According to the results of X-ray diffraction analysis using Cu Kα radiation, for the composite 2, peaks of Cu (111) crystal plane are observed, whereas the peak intensity of (220) crystal plane for the CuAg alloy are not observed. Accordingly, it is confirmed that the copper and the silver in the composite 2 according to an embodiment do not form an alloy.

The peaks of the Cu (111) crystal plane appear at a diffraction angle (2θ) in a range of about 43.1 degrees two-theta (2θ) to about 43.5 2θ, or about 43.2 2θ to about 43.4 2θ, or for example, at about 43.3 2θ. In addition, the peaks of the (220) crystal plane derived from the CuAg alloy appear at a diffraction angle 2θ of about 42.5 2θ, wherein an atomic ratio of Cu to Ag in the CuAg alloy may be 1:1.

A thickness of the interlayer is not particularly limited, and may be, for example, in a range of about 1 micrometer (μm) to about 50 μm, about 5 μm to about 30 μm, or about 5 μm to about 20 μm. When the thickness of the interlayer is within the ranges above, a short circuit of the all-solid-state secondary battery may be suppressed, thereby improving the cycle characteristics.

The composite 2 according to an embodiment may have a structure in which the first metal 4 is arranged on the second metal having a nanowire or a nanorod shape. Here, the first metal 4 may be in a form of a nanoparticle, a needle, or a rod. A combination comprising at least one of the foregoing forms may be used.

A second metal oxide layer, such as a copper oxide layer, does not exist between the second metal and the first metal. As such, due to the absence of a second metal oxide layer between the second metal and the first metal, adhesion therebetween is excellent, so that the migration of the first metal toward the current collector during charge and discharge may be effectively prevented.

Although not shown in FIG. 1B, the composite 2 may further include a carbon-based material. In this case, the first metal 4, the second metal 3, and the carbon-based material may be in a form of a composite. The carbon-based material may comprise amorphous carbon. The amorphous carbon may be a carbon having no crystallinity, or very low crystallinity, and may be distinguished from crystalline carbon or graphite-based carbon.

The amorphous carbon may include carbon black (CB), acetylene black (AB), furnace black (FB), KETJEN black (KB), graphene, or a combination thereof.

The carbon-based material may be in a form of a particle, and may have an average particle diameter of 4 μm or less, or in a range of about 10 nm to about 4 μm, about 10 nm to about 3 μm, about 10 nm to about 2 μm, about 10 nm to about 1 μm, or about 10 nm to about 900 nm. When the carbon-based material has the aforementioned average particle diameter, reversible lithium absorption and/or desorption during charge and discharge may be facilitated.

An average particle diameter (e.g., particle size) of the second anode active material may be, for example, a median diameter (D50) measured using a laser particle size distribution meter, e.g., by laser light diffraction.

The carbon-based material may have an electronic conductivity of about $1 \times 10^4$ Siemens per centimeter (S/cm). A difference between the electronic conductivity of either of the first metal or the second metal, and the electronic conductivity of the carbon-based material may be about $1 \times 10^3$ S/cm or more. The electronic conductivity of each of the first metal and the second metal may be about $1 \times 10^7$ S/cm or more, for example, about $5.8 \times 10^7$ S/cm or more, or in a range of about $5.8 \times 10^7$ S/cm to about $7 \times 10^7$ S/cm.

A method of preparing an anode interlayer according to an embodiment will be further described.

The anode interlayer may be prepared by first, providing a second metal having a non-spherical structure; arranging a first metal on the second metal to prepare a composite; and coating the composite and a binder on a substrate; and drying the coated substrate to prepare an anode interlayer. The substrate may be removed or separated to provide the anode interlayer.

The arranging a first metal on the second metal may include arranging the first metal on the second metal to prepare a composite; and then contacting the composite with a carbon-based material.

The arranging the first metal on the second metal to prepare a composite may be performed by a galvanic replacement reaction by contacting the second metal with an electrolytic solution containing a first metal precursor.

The arranging a first metal on the second metal may further include washing the composite by ultrasonication using an alcohol-based solvent; and vacuum-drying the same. Here, the alcohol-based solvent may include 2-propanol, ethanol, water, or a combination thereof. In addition, other than the alcohol-based solvent, deionized water may be also used as a solvent.

In addition, the method may further include, before the coating of the composite and a binder on a substrate, ultrasonically dispersing the composite in the alcohol-based solvent for an additional period of time. The ultrasonically dispersing may be performed for, for example, about 1 hour to about 4 hours, or about 1.5 hours to about 3 hours. When the ultrasonically dispersing is performed, self-aggregation of the composite may be effectively suppressed.

By the process of washing, an additive such as a surfactant may be removed, and formation of a natural oxide film, such as an oxide of the second metal, on the second metal may be prevented.

The providing of the second metal having a non-spherical structure may comprise, for example, using a copper nanowire as the second metal.

In the method of preparing the anode interlayer, the first metal may be obtained using the galvanic substitution reaction. In detail, the arranging of the first metal on the second metal may be performed by galvanic substitution by contacting the second metal in the electrolytic solution containing the first metal precursor.

The first metal precursor may include, for example, a nitrate, sulfate, or chloride of the first metal, such as silver nitrate, silver sulfate (e.g., $Ag_2SO_4$), chloroauric acid ($HAuCl_4$), or a combination thereof.

The electrolytic solution may further include a stabilizer, a reducing agent, or a combination thereof. Amounts of the stabilizer and the reducing agent may be a suitable amount, which can be determined by one of skill in the art without undue experimentation.

As the stabilizer, a surfactant such as cetrimonium bromide (CTAB) may be used. In addition, as the reducing agent, an agent of ascorbic acid, sodium borohydride ($NaBH_4$), a carboxylic acid, or a combination thereof may be used. The first metal precursor may be reduced by the reducing agent, and the first metal may be precipitated on the surface of the second metal.

The structure thus obtained may contact the carbon-based material to prepare the composite.

The contacting may include a mechanical milling process. The mechanical milling may be performed by using roll-mill, ball-mill, high-energy ball mill, planetary mill, stirred ball mill, vibrating mill, or jet-mill.

Another aspect of the present disclosure provides an anode for a secondary battery, including: an anode current collector; and the anode interlayer according to an embodiment.

Another aspect of the present disclosure provides a secondary battery including: a cathode layer including a cathode active material; an anode layer including an anode current collector; and a solid electrolyte layer arranged between the cathode layer and the anode layer and including a solid electrolyte, wherein the anode layer may include the anode according to an embodiment.

After charge and discharge of the secondary battery, the diffusion or migration of the first metal in the interlayer toward the anode current collector may be suppressed, so that the first metal may be uniformly distributed over an entire area of the interlayer.

In the anode layer, a first anode active material layer may be arranged between the anode current collector and the interlayer, and the first anode active material layer may be a metal layer comprising lithium metal, a lithium alloy, or a combination thereof.

In an aspect, the anode current collector, the interlayer, and a region therebetween may be lithium (Li)-free regions that do not include lithium in an initial state or a post-discharge state of the secondary battery. The first anode active material layer 22 may be precipitated between the anode current collector 21 and the interlayer 23 by charging after battery assembly. As such, when the first anode active material layer is provided by charging after battery assembly, the first anode active material layer may be omitted during assembly of the secondary battery so that the secondary battery may have increased energy density.

The secondary battery according to an embodiment may be, for example, an all-solid-state secondary battery.

An all-solid-state secondary battery will be described in more detail with reference to FIGS. 8 and 9.

Figure 8:
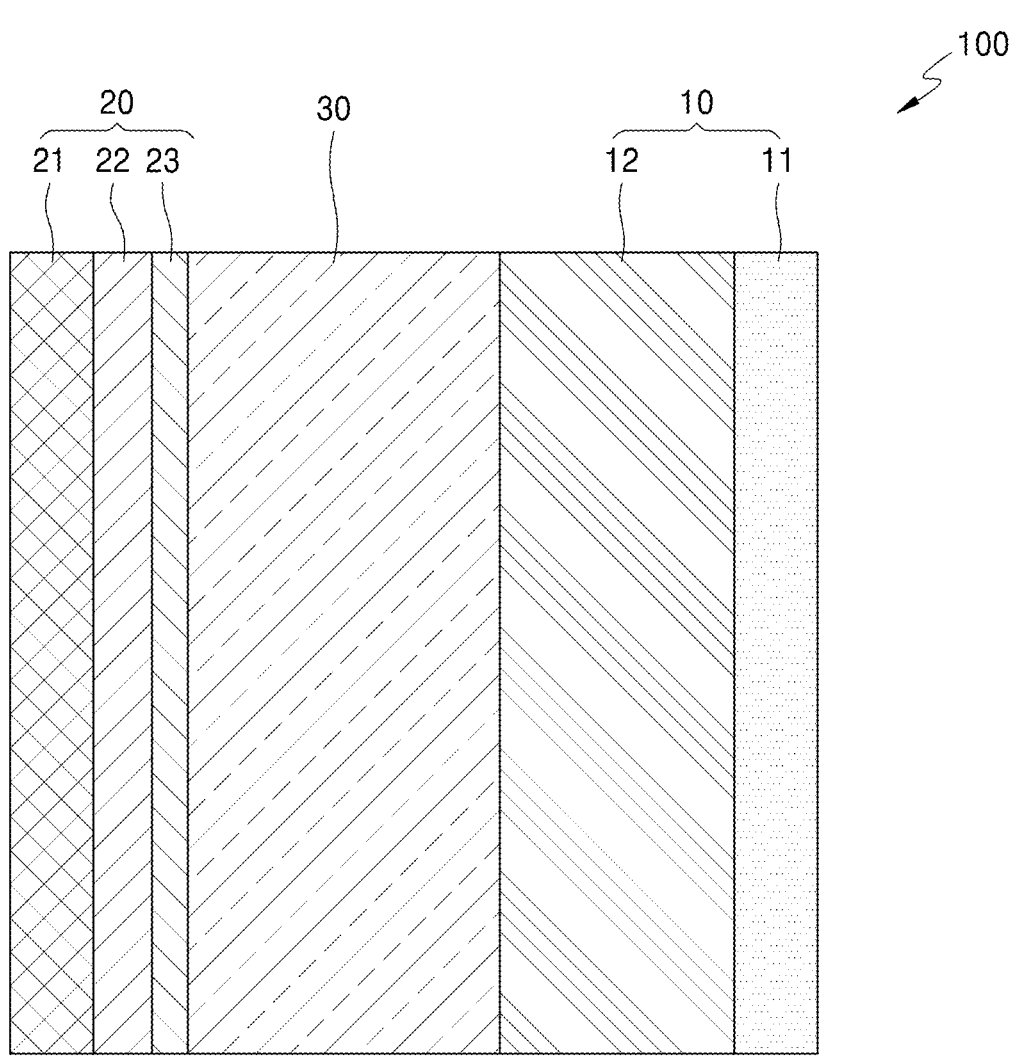
FIG. 8 is a schematic view of an embodiment of a structure of an all-solid-state secondary battery including an interlayer having a composite.
Figure 9:
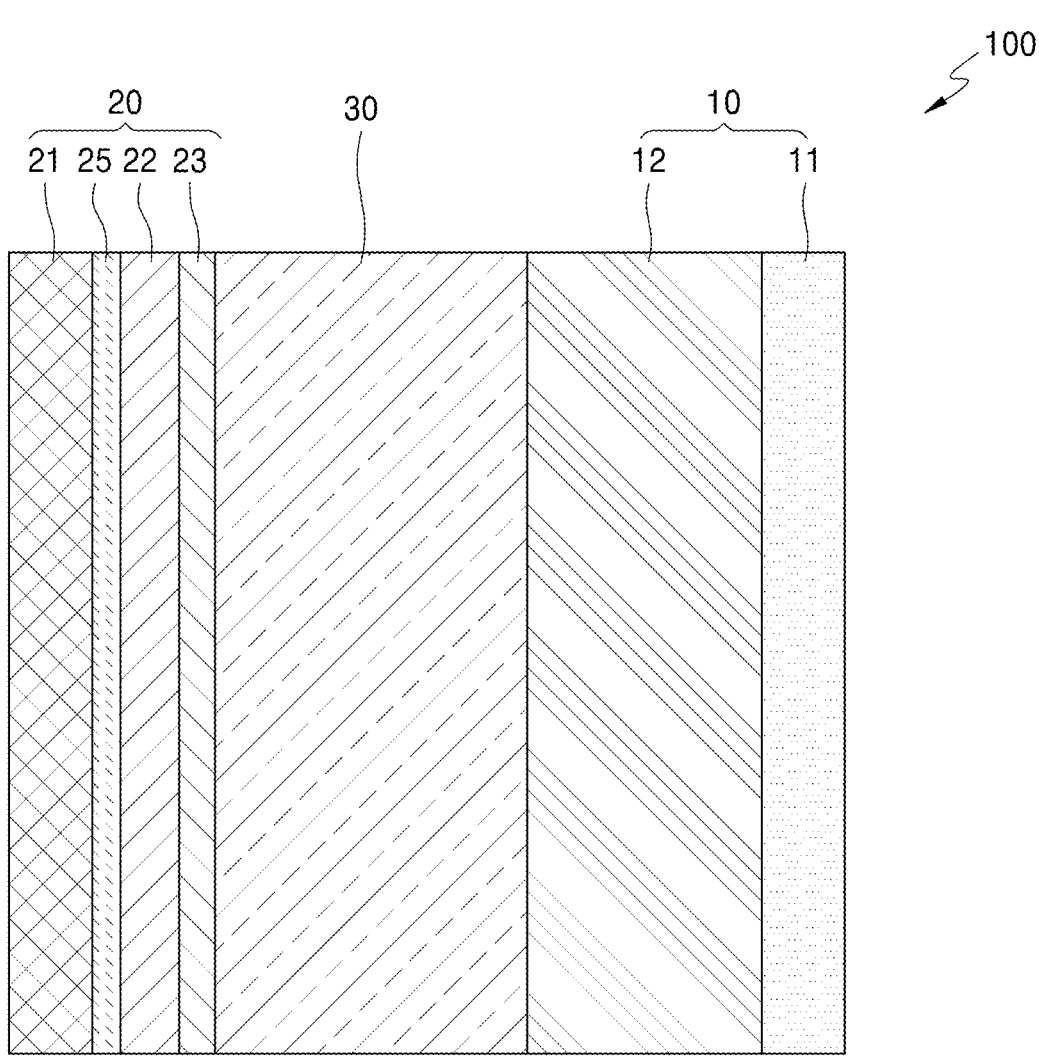
FIG. 9 is a schematic view of an embodiment of a structure of an all-solid-state secondary battery including an interlayer including the composite.

Referring to FIGS. 8 and 9, an all-solid-state secondary battery includes: a cathode layer 10 including a cathode current collector 11 and a cathode active material layer 12; an anode layer 20; and a solid electrolyte layer 30 arranged between the cathode layer 10 and the anode layer 20 and including a solid electrolyte, wherein the anode layer 20 includes: an anode current collector 21; an interlayer 23 arranged on the anode current collector 21 to be in contact with the solid electrolyte layer 30; and a first anode active material layer 22 between the anode current collector 21 and the interlayer 23.

The first anode active material layer 22 may comprise, for example, a lithium metal layer including a lithium metal, a lithium alloy, or a combination thereof.

The first anode active material layer 22 may be present at the time of assembly, or may not be present at the time of assembly and formed by charging. Therefore, the first anode active material layer 22 which is a metal layer including lithium may serve as, for example, a lithium reservoir.

In the present specification, the lithium alloy may be, for example, a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof, but is not limited thereto. Any suitable material alloyable with lithium in the art may be used. A third anode active material layer 25 may comprise lithium, or one or more of the foregoing alloys.

In one or more embodiments, the first anode active material layer may only include a first particle comprising the amorphous carbon, or may further include a second particle comprising a metal alloy of indium (In), silicon (Si), gallium (Ga), tin (Sn), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Ce), lanthanum (La), or a combination thereof. The first anode active material layer may include a mixture of the first particle and the second particle.

An amount of the second particle may be in a range of about 8 wt % to about 60 wt %, about 10 wt % to about 50 wt %, about 15 wt % to about 40 wt %, or about 20 wt % to about 30 wt %, based on a total weight of the mixture.

In one or more embodiments, referring to FIGS. 8 and 9, when the first anode active material layer 22 includes the first particle and the second particle, a lithium metal layer including a lithium metal, a lithium alloy, or a combination thereof, may be arranged between the first anode active material layer 22 and the interlayer 23. Such a lithium metal layer may be present at the time of battery assembly, or may be formed by charging.

A thicknesses of the first anode active material layer 22 and the interlayer 23 may each independently be, for example, about 50% or less, about 40% or less, about 30% or less, about 20% or less, or about 10% or less, or about 1% to about 50%, or about 2% to about 40%, or about 4% to about 30% of a thickness of the cathode active material layer 12. When the thickness of the first anode active material layer 22 and/or the interlayer 23 is less than the thickness of the cathode active material layer 12, the all-solid-state secondary battery may have improved energy density.

A thickness of the first anode active material layer 22 may be in a range of about 10 nm to about 500 nm, about 15 nm to about 480 nm, about 20 nm to about 450 nm, about 30 nm to about 420 nm, or for example, about 50 nm to about 300 nm.

The first anode active material layer 22 and/or the interlayer 23 may be arranged by, for example, a vacuum deposition method, a sputtering method, a plating method, or a combination thereof, but the method is not limited thereto. Any suitable method capable of forming an anode active material layer in the art may be used.

The interlayer 23 may include, for example, a binder. The binder may include, for example styrene-butadiene rubber (SBR), polytetrafluoroethylene, polyvinylidene fluoride, polyethylene, vinylidene fluoride/hexafluoropropylene copolymer, polyacrylonitrile, polymethylmethacrylate, or a combination thereof, but is not limited thereto. Any suitable material available as a binder in the art may be used. The binder may be used alone, or may be used with a plurality of different binders.

The first anode active material layer 22 may include the binder.

In addition, despite a change in volume and/or a relative position change of the first anode active material layer 22, cracking of the first anode active material layer 22 may be suppressed.

The interlayer 23 may further include a filler, a dispersant, an ion conductive material, or a combination thereof.

The anode current collector 21 may comprise, for example, a material that does not react with lithium, that is, a material that forms neither an alloy nor a compound with lithium. A material for forming the anode current collector 21 may be, for example, copper (Cu), stainless steel, titanium (Ti), iron (Fe), cobalt (Co), nickel (Ni), or a combination thereof, but is not limited thereto. Any suitable material available as an electrode current collector in the art may be used. The anode current collector 21 may comprise one of the above-described metals, or an alloy thereof. The anode current collector 21 may be, for example, in a form of a plate or a foil.

As shown in FIG. 9, in an all-solid-state secondary battery 100, a second anode active material layer 25 may be, for example, arranged between the anode current collector 21 and the first anode active material layer 22. Depending on the composition of the first anode active material layer 22, the second anode active material layer 25 may comprise a metal layer including lithium or a lithium alloy. The second anode active material layer 25 may be formed by charging.

In one or more embodiments, the second anode active material layer 25 may include an anode active material. For example, the second anode active material layer 25 may include the first particle and the second particle that are used for the formation of the first anode active material layer 22.

A thickness of the second anode active material layer 25 is not particularly limited, but may be, for example, in a range of about 1 μm to about 1,000 μm, about 1 μm to about 500 μm, about 1 μm to about 200 μm, about 1 μm to about 150 μm, about 1 μm to about 100 μm, or about 1 μm to about 50 μm, about 2 μm to about 500 μm, about 4 μm to about 250 μm, or about 8 μm to about 125 μm. When the thickness of the second active material layer 25 is within the ranges above, the cycle characteristics thereof may be improved while serving as a lithium reservoir. The second active material layer 25 may be, for example, a metal foil having a thickness with the ranges above.

In addition, when the first active material layer 22 is arranged by charging after the assembly of the all-solid-state secondary battery 100, the anode current collector 21, the interlayer 23, and a region therebetween may be, for example, Li-free regions that do not include Li in an initial state or in a post-discharge state of the all-solid-state secondary battery 100.

Solid Electrolyte Layer

Referring to FIGS. 8 and 9, the solid electrolyte layer 30 may include a solid electrolyte arranged between the cathode layer 10 and the anode layer 20.

The solid electrolyte may include, for example, an oxide-based solid electrolyte, a sulfide-based solid electrolyte, or a combination thereof. The oxide-based solid electrolyte may include $Li_{1+x+y}Al_xTi_{2-x}Si_yP_{3-y}O_{12}$ (wherein $0<x<2$ and $0\leq y<3$), $BaTiO_3$, $Pb(Zr_{1-y}Ti_y)O_3$ (PZT, wherein $0\leq y\leq1$), $Pb_{1-x}La_xZr_{1-y}Ti_yO_3$ (PLZT, wherein $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (wherein $0<x\leq2$ and $0<y\leq3$), $Li_xAl_yTi_z(PO_4)_3$ (wherein $0<x\leq2$, $0<y\leq1$, and $0<z\leq3$), $Li_{1+x+y}(Al_{1-z}Ga_z)_x(Ti_{1-p}Ge_p)_{2-x}Si_yP_{3-y}O_{12}$ (wherein $0\leq x\leq1$, $0\leq y\leq1$, $0\leq z\leq1$, and $0\leq p\leq1$), $Li_xLa_y$-$TiO_3$ (where $0<x\leq2$ and $0<y\leq3$), $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (where M is Te, Nb, or Zr, and x is an integer from 1 to 10), or a combination thereof. The solid electrolyte may be prepared by a sintering method. For example, the oxide-based solid electrolyte may include a garnet-type solid electrolyte of $Li_7La_3Zr_2O_{12}$ (LLZO) or $Li_{3+x}La_3Zr_{2-a}M_aO_{12}$ (M-doped LLZO, M is Ga, W, Nb, Ta, or Al, and x is an integer from 1 to 10).

In one or more embodiments, the solid electrolyte may include, for example, a sulfide-based solid electrolyte. The sulfide-based solid electrolyte may include, for example, $Li_2S$—$P_2S_5$, $Li_2S$—$P_2S_5$—LiX (wherein X is a halogen atom), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$-ZmSn (wherein m and n are each a positive number, and Z is one of Ge, Zn, or Ga), $Li_2S$—$GeS_2$, $Li_2S$—$SiS_2$—$Li_3PO_4$, $Li_2S$—$SiS_2$-$Li_pMO_q$ (wherein p and q are each a positive number, and M is one of P, Si, Ge, B, Al, Ga, or In), $Li_{7-x}PS_{6-x}Cl_x$, (where $0\leq x\leq2$), $Li_{7-x}PS_{6-x}Br_x$, (where $0\leq x\leq2$), $Li_{7-x}PS_{6-x}I_x$ (where $0\leq x\leq2$), or a combination thereof. The sulfide-based solid electrolyte may be, for example, prepared by treating a starting material, such as $Li_2S$, or $P_2S_5$ by a melting quenching method or a mechanical milling method. Also, after such treatment, heat treatment may be further performed. The sulfide-based solid electrolyte may be amorphous or crystalline, and may be a mixture.

In addition, the sulfide-based solid electrolyte may include, for example, sulfur (S), phosphorus (P), and lithium (Li), as constituent elements of the above-described sulfide-based solid electrolyte material. For example, the sulfide-based solid electrolyte may be a material including $Li_2S$—$P_2S_5$. When $Li_2S$—$P_2S_5$ is included as the sulfide-based solid electrolyte material, a molar ratio of $Li_2S$ to $P_2S_5$ ($Li_2S$:$P_2S_5$) may be, for example, in a range of about 50:50 to about 90:10.

The sulfide-based solid electrolyte may include a compound having an argyrodite crystal structure. The compound having an argyrodite-type crystal structure may include, for example, $Li_{7-x}PS_{6-x}Cl_x$ (where $0 \leq x \leq 2$), $Li_{7-x}PS_{6-x}Br_x$ (where $0 \leq x \leq 2$), $Li_{7-x}PS_{6-x}I_x$ (where $0 \leq x \leq 2$), or a combination thereof. In particular, the sulfide-based solid electrolyte included in the solid electrolyte may be an argyrodite-type compound including $Li_6PS_5Cl$, $Li_6PS_5Br$, $Li_6PS_5I$, or a combination thereof.

As a polymer electrolyte, any suitable material used as a polymer electrolyte for a secondary battery in the art may be used. The polymer electrolyte may include, for example, a polyethylene oxide film. The polymer electrolyte film may be prepared by, for example, mixing a lithium-ion conductive polymer and a lithium salt.

The lithium-ion conductive polymer may include, for example, polyethylene oxide, polyacrylonitrile, polyester, or a combination thereof.

The solid electrolyte layer 30 may further include, for example, a binder. The binder included in the solid electrolyte layer 30 may include, for example, styrene butadiene rubber (SBR), polytetrafluoroethylene, polyvinylidene fluoride, polyethylene, or a combination thereof, but is not limited thereto. Any suitable material available as a binder in the art may be used. The binder included in the solid electrolyte layer 30 may be the same as or different from the binders included in the cathode active material layer 12 and the anode active material layer 22.

Cathode Layer

The cathode layer 10 may include a cathode current collector 11 and a cathode active material layer 12.

The cathode current collector 11 may be, for example, in a form of a plate or a foil, each comprising indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode layer 12 may include, for example, a cathode active material.

The cathode active material may be capable of reversibly absorbing or desorbing lithium ions. The cathode active material may include, for example, a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, nickel sulfide, copper sulfide, lithium sulfide, iron oxide, vanadium oxide, or a combination thereof, but is not limited thereto. Any suitable material available as the cathode active material in the art may be used. The cathode active material may be used alone or in a mixture of two or more materials.

The lithium transition metal oxide may be, for example, a compound represented by: $Li_aA_{1-b}B'_bD_2$ (wherein $0.9 \leq a \leq 1$, and $0 \leq b \leq 0.5$); $Li_aE_{1-b}B'_bO_{2-c}D_c$ (wherein $0.9 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.9 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.9 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.9 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.9 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.9 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.9 \leq a \leq 1$, $0 \leq b \leq 0.5$, $0 \leq c \leq 0.05$, and $0 < \alpha < 2$); $Li_aNi_bE_cG_dO_2$ (wherein $0.9 \leq a \leq 1$, $0 \leq b \leq 0.9$, $0 \leq c \leq 0.5$, and $0.001 \leq d \leq 0.1$); $Li_aNi_bCo_cMn_dG_eO_2$ (wherein $0.9 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.9 \leq a \leq 1$, and $0.001 \leq b \leq 0.1$); $Li_aCoG_bO_2$ (wherein $0.9 \leq a \leq 1$, and $0.001 \leq b \leq 0.1$); $Li_aMnG_bO_2$ (wherein $0.9 \leq a \leq 1$, and $0.001 \leq b \leq 0.1$; $Li_aMn_2G_bO_4$ (wherein $0.9 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$. In the compound represented by the formulae above, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof. A compound having a coating layer added to the surface of the compound described above may be also used, and a mixture of the compound described above and a compound having a coating layer added thereto may be also used. Such a coating layer added to the surface of the compound may include, for example, a coating element compound such as an oxide of a coating element, hydroxide, oxyhydroxide of a coating element oxycarbonate of a coating element, or hydroxy carbonate of a coating element. Such a coating element compound comprising the coating layer may be amorphous or crystalline. The coating element included in the coating layer may include Mg, Al, Co, K, Na, Ca, Si, Ti, V, Sn, Ge, Ga, B, As, Zr, or a mixture thereof. A method of forming coating layer may be selected within a range that does not adversely affect the physical properties of the cathode active material. A coating method may include, for example, spray coating, or dipping. A specific coating method is well understood by those skilled in the art, and thus a detailed description thereof will be omitted.

The cathode active material may include, for example, a lithium salt of a transition metal oxide having a layered rock salt type, among the lithium transition metal oxides described above. The lithium transition metal oxide having such a layered rock salt type may include, for example, a ternary lithium transition metal oxide such as $LiNi_xCo_yAl_zO_2$ (NCA) (where $0 < x < 1$, $0 < y < 1$, $0 < z < 1$, and $x+y+z=1$) or $LiNi_xCo_yMn_zO_2$ (NCM) (where $0 < x < 1$, $0 < y < 1$, $0 < z < 1$, and $x+y+z=1$). When the cathode active material includes a ternary lithium transition metal oxide having a layered rock salt type, the all-solid-state secondary battery 100 may have further improved energy density and thermal stability.

The cathode active material may be covered by the coating layer as described above. For use as the coating layer, any coating layer suitable for a cathode active material of an all-solid-state secondary battery in the art may be used. The coating layer may be, for example, $Li_2O$—$ZrO_2$.

When the cathode active material includes, for example, Ni as the ternary lithium transition metal oxide such as NCA or NCM, the volume density of the all-solid-state secondary battery 100 may increase to reduce the metal elution of the cathode active material in a charged state. Consequently, the cycle characteristics of the all-solid-state secondary battery 100 may be improved.

The cathode layer 10 may further include, in addition to the cathode active material, an additive such as a conductive material, a binder, a filler, a dispersant, an ion conductive auxiliary agent, or a combination thereof. The conductive material may include, for example, graphite, carbon black, acetylene black, ketjen black, carbon fiber, metal powder, or a combination thereof. The binder may include, for example, SBR, polytetrafluoroethylene, polyvinylidene fluoride, polyethylene, or a combination thereof. As a coating agent, a dispersant, an ion conductive auxiliary agent, or a combination thereof that is blendable into the cathode layer 10, a suitable material used for a solid secondary battery in the art may be used.

The cathode layer 10 may further include a solid electrolyte. The solid electrolyte included in the cathode layer 10 may be similar to or different from the solid electrolyte included in the solid electrolyte layer 30. Further details of the solid electrolyte may be understood by referring to the foregoing additional description of the solid electrolyte layer 30.

The solid electrolyte included in the cathode layer 10 may include, for example, an oxide-based solid electrolyte, a sulfide-based solid electrolyte, or a combination thereof. As the sulfide-based solid electrolyte and the oxide-based solid electrolyte, the sulfide-based solid electrolyte and the oxide-based solid electrolyte used for the solid electrolyte layer may be used.

Alternatively, the cathode layer 10 may be, for example, impregnated with a liquid electrolyte. The liquid electrolyte may include a lithium salt and an ionic liquid, a polymer ionic liquid, or a combination thereof. The liquid electrolyte may be non-volatile. The ionic liquid may have a melting point below the room temperature, and may refer to a salt in a liquid state at room temperature or a molten salt at room temperature, each comprising only ions. The ionic liquid may include compounds including: a) cations of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and b) anions of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof. The ionic liquid may include, for example, N-methyl-N-propylpyrrolidinium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)amide, 1-ethyl-3-methylimidazolium bis(trifluoromethylsulfonyl)amide, or a combination thereof. The polymeric ionic liquid may include a repeating unit including: a) a cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and b) an anions of $BF_4^-$, $PF_6^-$, $AsF_6^-$, $SbF_6^-$, $AlCl_4^-$, $HSO_1^-$, $ClO_4^-$, $CH_3SO_3^-$, $CF_3CO_2^-$ $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3$, $Al_2Cl_7^-$ $CF_3SO_2)_3C^-$, $(CF_3)_2PF_4^-$, $(CF_3)_3$ $PF_3^-$, $(CF_3)_4PF_2^-$, $(CF_3)_5$ $PF^-$, $(CF_3)_6P^-$, $SF_5CF_2SO_3^-$, $SF_5CHFCF_2SO_3^-$, $CF_3CF_2$ $(CF_3)_2CO^-$, $(CF_3SO_2)_2CH^-$, $(SF_5)_3C^-$, $(O(CF_3)_2C_2(CF_3)_2$ $O)_2PO^-$, or a combination thereof; or a combination thereof. As the lithium salt, any suitable material in the art as a lithium salt may be used. The lithium salt may include, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiA_1O_2$, $LiAlCl_4$, $LiN(C_xF_{2x+1}SO_2)(C_yF_{2y+1}SO_2)$ (wherein x and y are natural numbers), LiCl, LiI, or a mixture thereof. The lithium salt included in the liquid electrolyte may have a concentration in a range of about 0.1 molar (M) to about 5 M. An amount of the liquid electrolyte impregnated in the cathode layer 10 may be, based on 100 parts by weight of the cathode active material 12 not including the liquid electrolyte, in a range of about 0 part by weight to about 100 parts by weight, about 0 part by weight to about 50 parts by weight, about 0 part by weight to about 30 parts by weight, about 0 part by weight to about 10 parts by weight, or about 0.1 part by weight to about 5 parts by weight.

Hereinafter, the present disclosure will be described in more detail through Examples and Comparative Examples below. However, these examples are merely representative, and the scope of the present disclosure is not limited thereto.

EXAMPLES

Preparation of Copper Nanowire

Preparation Example 1

0.13 M of Copper(II) chloride ($CuCl_2$, 97%, Sigma Aldrich), 0.13 M of glucose (98%, Samchun), and 0.56 M of hexadecylamine (90%, Sigma Aldrich) were added to ultra pure water (18 megaohms (MO)), and sufficiently stirred for 12 hours or more.

Afterwards, the mixed solution was put into a high-pressure reactor, and subjected to hydrothermal synthesis at 120 degree Celsius (° C.) for 12 hours. A brown solution obtained after the hydrothermal synthesis was centrifuged (at 11,000 rotations per minute (rpm)) to remove a residue remaining in a supernatant. Then, the resulting product was sufficiently washed with water.

The washing product was added to a solution in which hexane (Sigma Aldrich) and ultra pure water were mixed, and then vigorously stirred for at least 10 minutes so that the two solutions were sufficiently mixed. The supernatant solution among the two separated solutions was separately collected and washed with hexane to prepare copper nanowires.

2 millimolar (mM) of polyvinylpyrrolidone (average molecular weight (Mw) of about 55,000, Sigma Aldrich) which is a dispersant was added to 2-propanol (99.7%, Sigma Aldrich), and sufficiently mixed to prepare a mixture. The copper nanowires were added to the mixture, stirred for 2 hours, washed with 2-propanol, and then dried and stored in a vacuum.

Preparation of Composite, Interlayer and all-Solid-State Battery

Example 1: NCA (6.2 Milliampere-Hours Per Square Centimeter ($mAh/cm^2$))/LLZTO/Interfacial Layer (Ag+Cu/C)/Li 60 milligrams (mg) of silver nitrate (99.0%, Sigma Aldrich) was dissolved in 6 milliliters (mL) of ultra pure water, and 0.7 mL of an ammonia solution (30%, Junsei) diluted 5 times with ultra pure water was added thereto. The mixed solution was uniformly mixed to obtain a first mixture including silver (Ag).

20 mL of ultra pure water and the copper nanowires of Preparation Example 1 were sufficiently mixed, and nitrogen purging was performed thereon for at least 30 minutes. By performing nitrogen purging, surface oxidation of the copper nanowires may be prevented. While continuing the nitrogen purging, 200 liters (L) of the first mixture containing Ag obtained according to the procedure described above was slowly added thereto and stirred for 2 hours.

Powder was separated from the stirred reaction product by centrifugation, and then dried in a vacuum. Afterwards, in an argon gas atmosphere, the dried product was heat treated at 200° C. for 1 hour, and stored in a vacuum state, so as to prepare a copper/silver structure. The copper/silver structure had a structure in which needle-like silver was bonded to the copper nanowires.

The copper/silver structure was sonicated in ethanol for 3 hours to prevent self-aggregation thereof in advance.

On a stainless steel substrate, the copper/silver structure and carbon black (CB) having a particle diameter of about 38 nm as a carbon-based material were mixed. Then, a mixture in which 2.692 grams (g) of a PVA-PAA binder solution (SUMITOMO SEIKA CHEMICALS CO., LTD, AG binder) was mixed with 7 g of distilled water was added thereto, and a first stirring was performed thereon at a speed of 1,000 rpm for 30 minutes, thereby preparing a slurry. In the slurry, an amount of the CB which is a carbon-based material was about 70 parts by weight, based on 100 parts by weight of the total weights of the copper/silver structure and the carbon-based material.

The slurry was spin-coated on the substrate, dried at room temperature (25° C.) for 1 hours, and then dried in a vacuum for 12 hours, thereby stacking an interlayer having a thickness of about 10 μm and including the composite and the binder. In the interlayer, an amount of the carbon-based material in the composite was about 70 parts by weight, an amount of the silver was about 5 parts by weight, and an amount of the copper was about 25 parts by weight. Here, an aspect ratio of the silver to the copper was 1:20.

A lithium thin-film (having a thickness of 20 um) was stacked on an anode current collector having a thickness of 10 um and consisting of a copper foil, thereby preparing an anode current collector including a lithium thin-film stacked thereon.

The interlayer prepared according to the process described above was stacked on the anode current collector in which the lithium thin-film was stacked. Then, the stainless steel substrate was separated and removed therefrom, thereby preparing an anode. A solid electrolyte layer (e.g., a LLZO film) was stacked on the anode, thereby preparing a solid electrolyte layer/anode layer stacked structure. Here, as a solid electrolyte layer, a LLZO ($Li_7La_3Zr_2O_{12}$) layer was prepared.

Preparation of Cathode Layer

As a cathode active material, $LiNi_{0.8}Co_{0.15}Al_{0.05}O_2$ (NCA) was prepared. In addition, as a binder, polytetrafluoroethylene (Dupont TEFLON was prepared. In addition, as a conductive agent, a carbon nanofiber (CNF) was prepared.

Then, using these materials, the cathode active material, the conductive agent, and the binder were mixed at a weight ratio of 100:2:1, to prepare a mixture. The mixture was stretched in the form of a sheet to prepare a cathode active material sheet. In addition, the cathode active material sheet was compressed on a cathode current collector having a thickness of 18 μm and consisting of an aluminum foil, thereby preparing a cathode layer.

The cathode active material layer of the cathode layer thus prepared was impregnated with an electrolytic solution in which 2 M of LiFSI was dissolved in N-propyl-N-methyl-pyrrolidinium bis(fluorosulfonyl)imide (PYR13FSI) as an ionic liquid.

Preparation of all-Solid-State Battery

The cathode layer was arranged in a stainless steel (SUS) cap in a way that the cathode active material impregnated with the electrolytic solution containing the ionic liquid was placed on top. The solid electrolyte layer/anode layer stacked structure to which the anode layer was attached was arranged in a way that the solid electrolyte layer was arranged on the cathode active material layer, and then, sealed to prepare an all-solid-state secondary battery. The cathode layer and the anode layer were each insulated with an insulator. A portion of each of the cathode current collector and the anode current collector was protruded to the outside of the sealed battery to be used as a cathode layer terminal and an anode layer terminal.

Example 2

An interlayer, an anode, and an all-solid-state battery including the anode were prepared in the same manner as in Example 1, except that spherical Ag (average particle diameter: 70 nm) was used instead of needle-like Ag and the aspect ratio of Ag to copper nanowires was changed to 1:50.

Example 3

An interlayer, an anode, and an all-solid-state battery including the anode were prepared in the same manner as in Example 1, except that a weight ratio of Ag to Cu in a composite was changed from 1:5 to 1:9.

Examples 4 and 5

An interlayer, an anode, and an all-solid-state battery including the anode were prepared in the same manner as in Example 1, except that nickel nanowires and tungsten nanowires were respectively used instead of the copper nanowires.

Example 6

An interlayer, an anode, and an all-solid-state battery including the anode were prepared in the same manner as in Example 1, except that a weight ratio of Ag to Cu in a composite was changed from 1:5 to 1:2.3.

Comparative Example 1: NCA (6.2 $mAh/cm^2$)/LLZTO/Interlayer(Ag/C)/Li

An interlayer, an anode, and an all-solid-state battery including the anode were prepared in the same manner as in Example 1, except that a method of forming an interlayer was changed as follows.

As anode active materials, CB having a particle diameter of about 38 nm and Ag particles having an average particle diameter of about 100 nm were prepared.

3 g of the CB and 1 g of the Ag particles were added to a vessel, and 7 g of distilled water containing 2.692 g of a PVA-PAA binder (manufacturer: SUMITOMO SEIKA CHEMICALS CO., LTD, Product name: AG binder) was added thereto. Then, first stirring was performed thereon at a speed of 1,000 rpm for 30 minutes, thereby preparing a slurry.

Separately, on a stainless steel substrate, the slurry was spin-coated, dried at room temperature (25° C.) for 1 hour, and then dried in a vacuum for 12 hours, thereby stacking a nano-Ag—C coating layer having a thickness of about 10 μm. In the nano-Ag—C coating layer, an amount of carbon was 70 parts by weight.

Comparative Example 2

An interlayer, an anode, and an all-solid-state battery including the anode were prepared in the same manner as in Example 1, except that, in preparing of a slurry for forming an interlayer, a mixture of Ag nanowires added to the Cu nanowires of Preparation Example 1 was used instead of the copper/silver composite to provide a weight ratio of 2:8 (Ag:Cu).

Comparative Example 3

An interlayer, an anode, and an all-solid-state battery including the anode were prepared in the same manner as in Example 1, except that, in preparing of a slurry for forming an interlayer, Cu nanoparticles (average diameter: 70 nm) and Ag nanoparticles (average particle diameter: 70 nm) were used instead of the Cu nanowires and the needle-like Ag, respectively, and that an aspect ratio of the Cu nanoparticles and the Ag nanoparticles had the same aspect ratio.

Comparative Example 4

An interlayer, an anode, and an all-solid-state battery including the anode were prepared in the same manner as in Comparative Example 2, except that, in preparing of a slurry for forming an interlayer, Co nanoparticles (average particle diameter: 70 nm) were used instead of the Cu nanowires, and that Ag nanoparticles (average particle diameter: 70 nm) was additionally used.

Evaluation Example 1: SEM-EDS Analysis

Figure 3A:
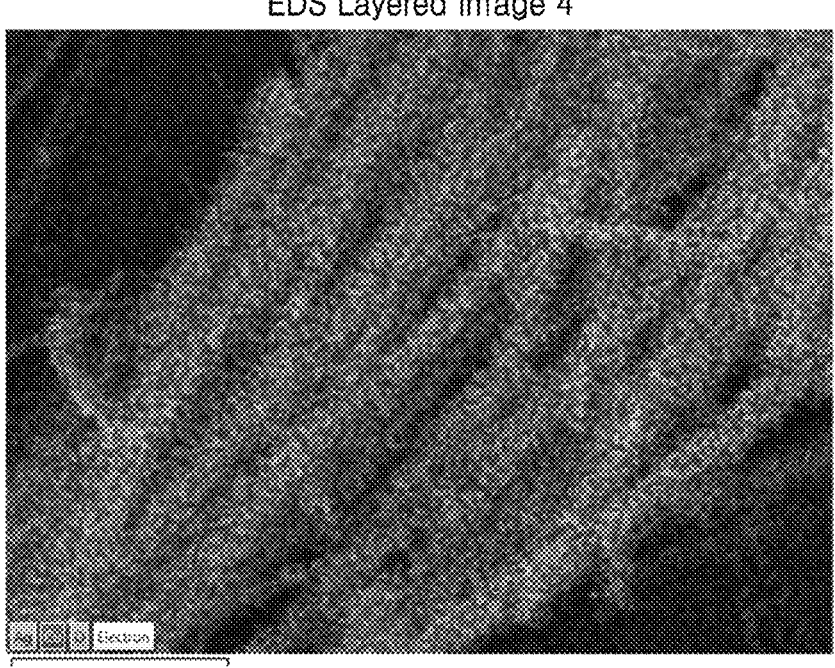
FIGS. 3A to 3C show the results of scanning electron microscopy-energy dispersive X-Ray spectroscopy (SEM-EDS) analysis of a composite prepared according to Example 1.

The composite of Example 1 was analyzed by scanning electron microscopy-energy dispersive X-Ray spectroscopy analysis (SEM-EDS). The analysis results are shown in FIGS. 3A to 3C.

Figure 3B:
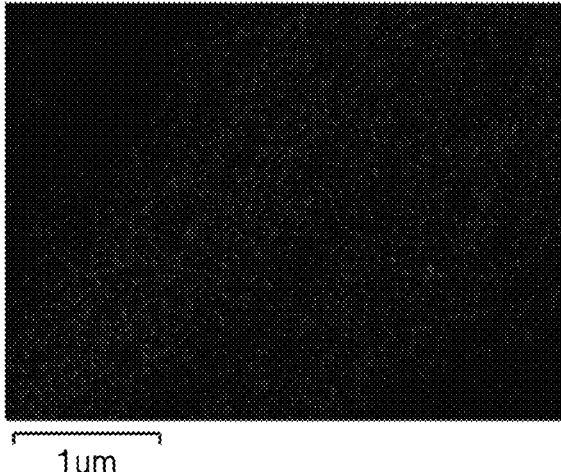
Figure 3C:
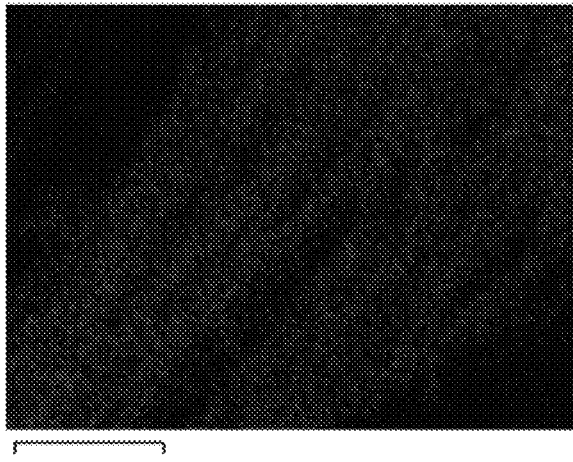

Referring to FIG. 3, it was confirmed that the composite of Example 1 had a structure in which the nano-sized needle-shape particles were bonded onto the copper nanowires. In addition, the mapping results on Ag and Cu are shown in FIGS. 3B and 3C. Results of analyzing the amounts of Cu and Ag through EDS are as shown in Table 1. In addition, in the composite, the amount of Ag was about 5 wt % based on the total weight of the composite including the second metal (Cu)-first metal (Ag) and the carbon-based material.

TABLE 1

| Metal | Amount (wt %) |
|-------|---------------|
| Cu | 79.72 |
| Ag | 20.28 |

Evaluation Example 2: Interfacial Resistance

For the all-solid-state secondary batteries of Example 1 and Comparative Example 1, overall resistance was measured, respectively. For the all-solid-state secondary batteries of Example 1 and Comparative Example 1, impedance was measured by a 2-probe method using an impedance analyzer (Solartron 1400A/1455A impedance analyzer). Here, the frequency range was from 0.1 hertz (Hz) to 1 megahertz (MHz), and the amplitude voltage was 10 millivolts (mV). The measurement was performed at 25° C. in the air atmosphere. Nyquist plots for the impedance measurement results are shown in FIG. 4.

Figure 4:
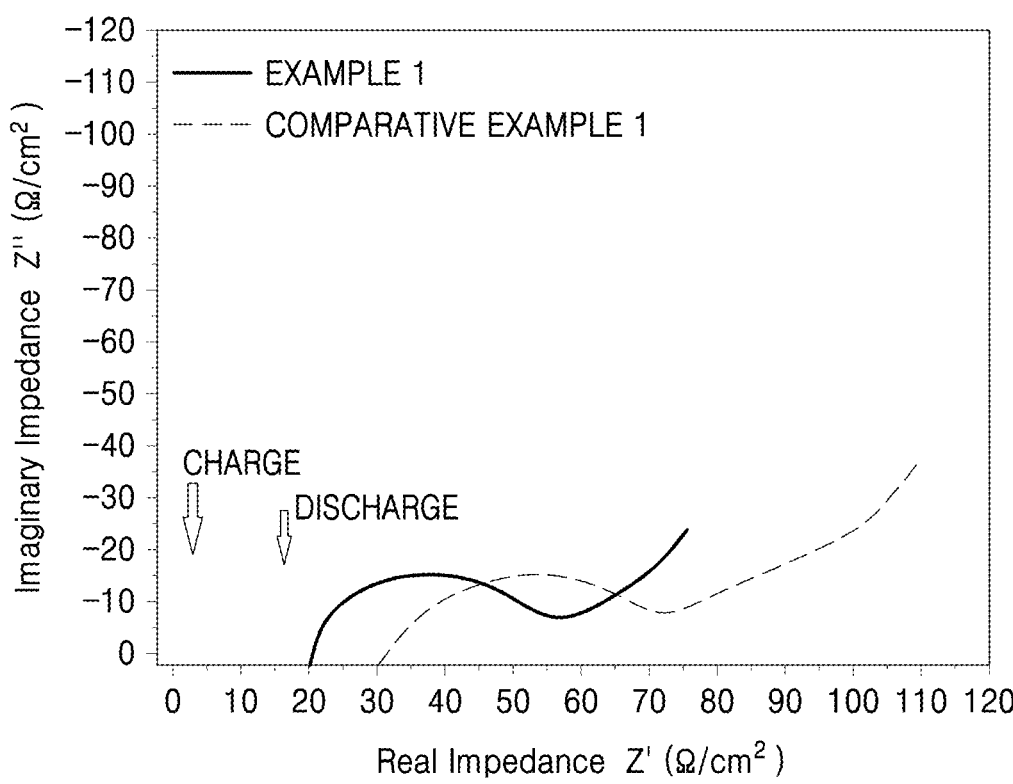
FIG. 4 is a graph of imaginary impedance (Z″, ohms per square centimeter, $\Omega/cm^2$) vs. real impedance (Z′, $\Omega/cm^2$) that shows impedance characteristics of all-solid-state secondary batteries prepared according to Example 1 and Comparative Example 1.

As shown in FIG. 4, the interfacial resistance of the all-solid-state secondary battery of Example 1 was reduced compared to that of the all-solid-state secondary battery of Comparative Example 1.

Evaluation Example 3: High-Rate Charge and Discharge Characteristics

Charge and discharge characteristics of the all-solid-state secondary batteries of Example 1 and Comparative Example 1 were evaluated by the following charge/discharge test. The charge/discharge test was performed by putting the all-solid-state secondary battery in a thermostatic bath at 25° C.

Then, high-rate charge and discharge characteristics of the all-solid-state battery were evaluated as follows.

The all-solid-state batteries of Example 1 and Comparative Example 1 were charged in a constant current mode at a current rate of 0.1C at 60° C. until the voltage reached 4.35 V (vs. Li), and then, while maintaining the voltage of 4.35 V in the constant voltage mode, the voltage was cut-off at a current rate of 0.05C. Subsequently, the batteries were discharged at a constant current rate of 0.1C until the voltage reached 2.85 V (vs. Li) ($1^{st}$ cycle, formation cycle).

The all-solid-state secondary batteries that have undergone the $1^{st}$ cycle were charged in a constant current mode at a current rate of 0.5C at 60° C. until the voltage reached 4.35 V (vs. Li), and then, while maintaining the voltage of 4.35 V in the constant voltage mode, the voltage was cut-off at a current rate of 0.05C. Subsequently, the batteries were discharged at a constant current rate of 0.5C until the voltage reached 2.85 V (vs. Li) ($2^{nd}$ cycle).

After every one charge/discharge cycle in all the charge/discharge cycles, there was a 1-minute pause time (open circuit).

Figure 5:
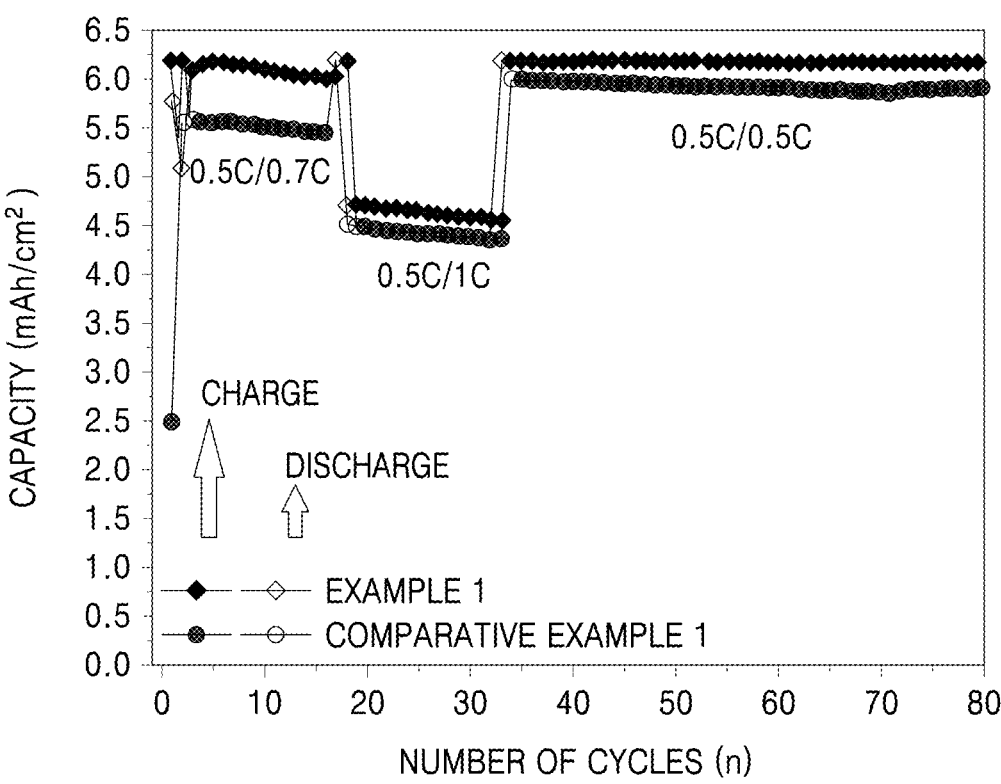
FIG. 5 is a graph of capacity (milliampere-hours per square centimeter, $mAh/cm^2$) vs. number of cycles (n) and shows high-rate discharge characteristics of all-solid-state secondary batteries prepared according to Example 1 and Comparative Example 1.
Figure 6A:
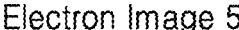
FIG. 6A is a transmission electron microscopy (TEM) image showing a state of an anode (lithium thin-film/interlayer)/solid electrolyte after a charge and discharge cycle of the all-solid-state secondary battery of Example 1.
Figure 6A:
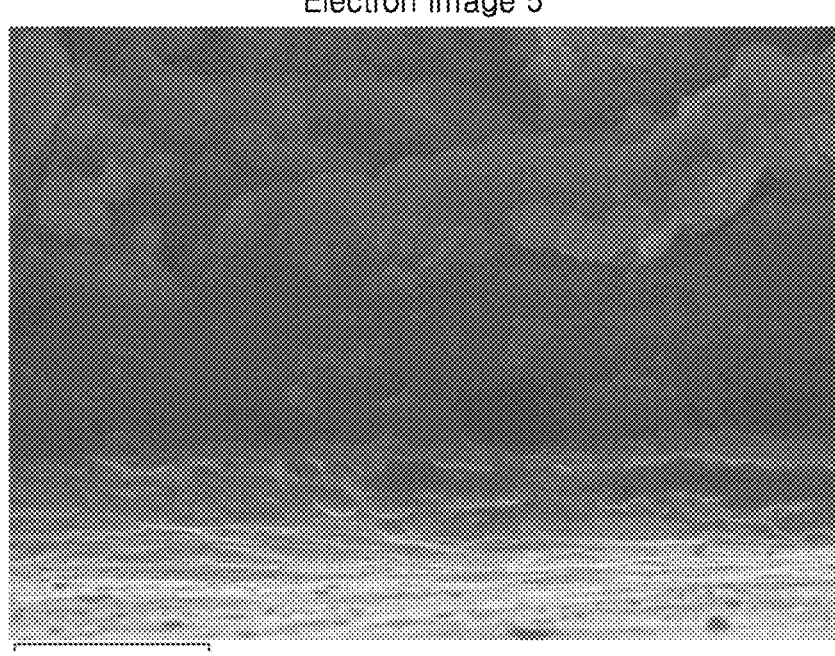
Figure 6B:
FIGS. 6B and 6C show the results of energy dispersive X-Ray spectroscopy (EDS) analysis for silver and copper, respectively, that are included in an anode interlayer of an all-solid-state secondary battery of Example 1.
Figure 6B:
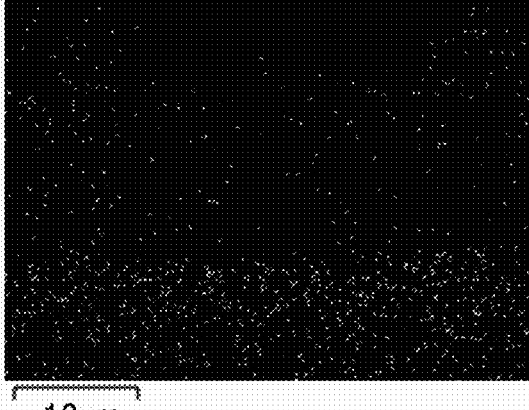
Figure 6C:
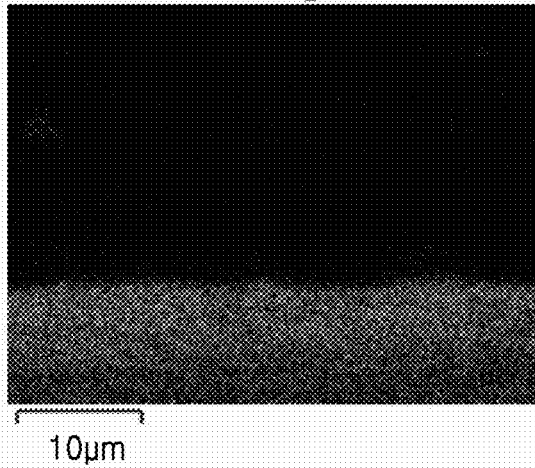
Figure 7A:
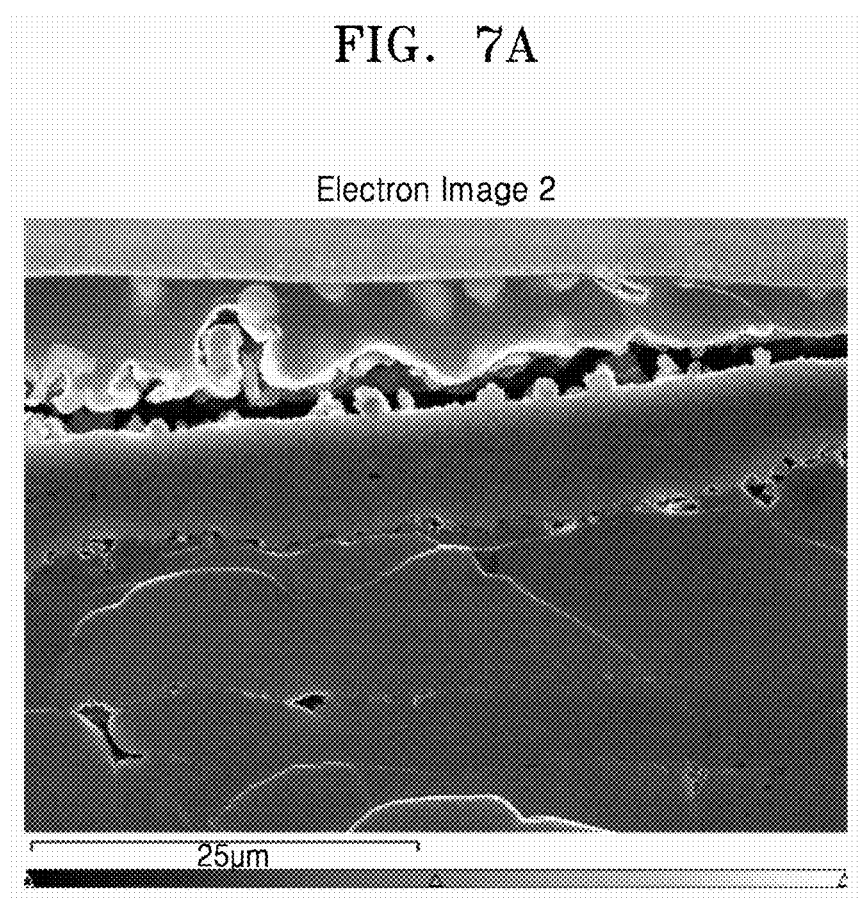
FIG. 7A is a TEM image showing an anode/interlayer/solid electrolyte after a charge and discharge cycle of the all-solid-state secondary battery of Comparative Example 1.
Figure 7B:
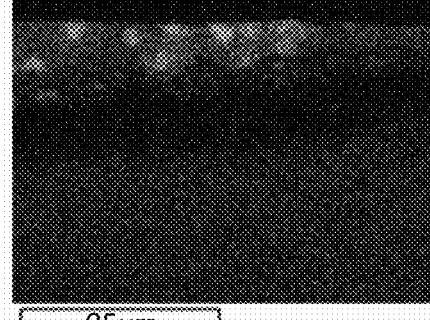
FIG. 7B and FIG. 7C respectively show the results of EDS analysis for silver and copper, respectively, that are included in an anode interlayer of an all-solid-state secondary battery of Comparative Example 1.
Figure 7C:
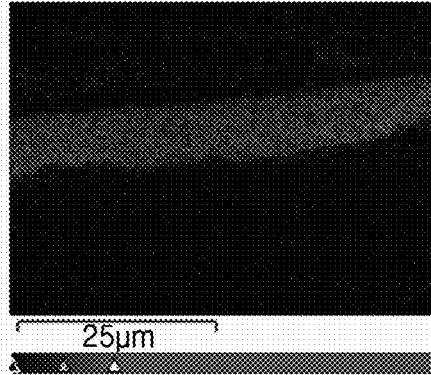

Results of the evaluation are shown in FIGS. 5, 6A to 6C, and 7A to 7C, respectively. FIG. 5 shows the high-rate discharge characteristics in the all-solid-state secondary batteries of Example 1 and Comparative Example 1. In 0.5C/0.7C in FIG. 5, 0.5C and 0.7C mean charging and discharging conditions, respectively. FIG. 6A is a TEM image showing the state of the anode (lithium thin-film/interlayer)/solid electrolyte layer after 80 cycles of the all-solid-state secondary battery of Example 1, and FIGS. 6B and 6C are the EDS analysis images for Ag and Cu included in the anode interlayer of the all-solid-state secondary battery of Example 1. In addition, FIG. 7A is a TEM image showing the state of the anode (lithium thin-film/interlayer)/solid electrolyte layer after 80 cycles of the all-solid-state secondary battery of Comparative Example 1, and FIGS. 7B and 7C are the EDS analysis images for Ag and Cu included in the anode interlayer of the all-solid-state secondary battery of Comparative Example 1.

Referring to FIG. 5, it was confirmed that the all-solid-state secondary battery of Example 1 had improved high-rate charge and discharge characteristics compared to that of Comparative Example 1.

In terms of cell resistance, the all-solid-state secondary battery of Example 1 had cell resistance that was only 80% of the all-solid-state secondary battery of Comparative Example 1. Accordingly, it was confirmed that the contact resistance at the interface between the anode and the solid electrolyte layer was improved so that, at the time of high-rate discharge, the capacity retention rate was improved by 12% compared to the case of Comparative Example 1.

As shown in FIG. 7A, it was confirmed that, in the all-solid-state secondary battery of Comparative Example 1, voids were present in the interlayer between the anode and the solid electrolyte layer and that the interface between the anode and the solid electrolyte layer was non-uniform. As shown in FIGS. 7B and 7C, the Cu diffusion was not observed, whereas the Ag diffusion toward the current collector was observed. As such, when the Ag diffusion toward the current collector occurred, Ag did not recover to its original position even during discharge. In this regard, it became difficult to equalize the current distribution, thereby degrading output characteristics of the all-solid-state secondary battery.

In addition, when identified with an SEM cross-sectional image after performing a charge and discharge cycle more than 10 times at 0.5C, it was confirmed that, in terms of the aggregation property of Ag, the particle diameter of Ag increased more than 100 times from 60 nm to 10 μm compared to the initial stage after charge and discharge as shown in FIG. 7B.

In contrast, as shown in FIG. 6A, the all-solid-state secondary battery of Example 1 showed a uniform interface without forming voids in the interlayer. In addition, as shown in FIGS. 6B and 6C, the Cu and Ag diffusion did not appear.

Evaluation Example 4: Charge and Discharge Characteristics

Charge and discharge characteristics of the all-solid-state secondary batteries of Example 1 and Comparative Example 4 were evaluated by the following charge/discharge test. The charge/discharge test was performed by putting the all-solid-state secondary battery in a thermostatic bath at 25° C.

Then, the charge and discharge characteristics of the all-solid-state battery were evaluated as follows.

The all-solid-state batteries of Example 1 and Comparative Example 1 were charged in a constant current mode at a current rate of 0.1C at 60° C. until the voltage reached 4.35 V (vs. Li), and then, while maintaining the voltage of 4.35 V in the constant voltage mode, the voltage was cut-off at a current rate of 0.05C. Subsequently, the batteries were discharged at a constant current rate of 0.1C until the voltage reached 2.85 V (vs. Li) ($1^{st}$ cycle, formation cycle).

The all-solid-state batteries that have undergone the $1^{st}$ cycle were charged in a constant current mode at a current rate of 0.5 C at 60° C. until the voltage reached 4.35 V (vs. Li), and then, while maintaining the voltage of 4.35 V in the constant voltage mode, the voltage was cut-off at a current rate of 0.05C. Subsequently, the batteries were discharged at a constant current rate of 0.5C until the voltage reached 2.85 V (vs. Li) ($2^{nd}$ cycle).

After every one charge/discharge cycle in all the charge/discharge cycles, there was a 1-minute pause time.

Figure 10:
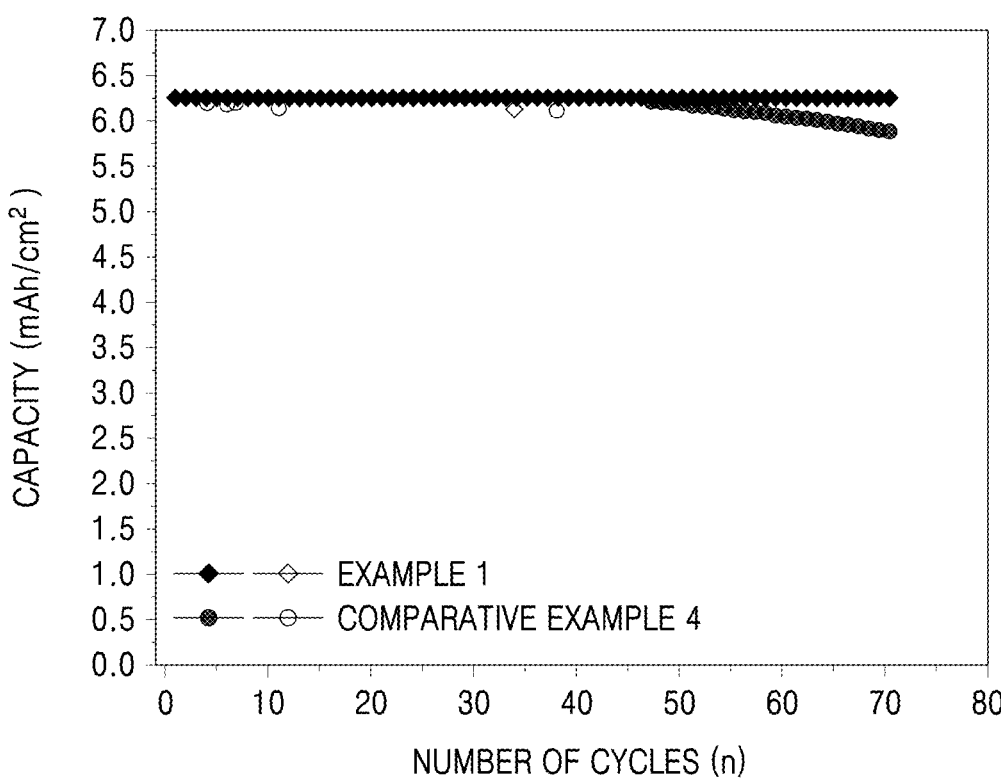
FIG. 10 is a graph of capacity (milliampere-hours per square centimeter, $mAh/cm^2$) vs. number of cycles (n) and shows changes in discharge capacity according to the number of cycles of all-solid-state secondary batteries prepared according to Example 1 and Comparative Example 4.
Figure 11:
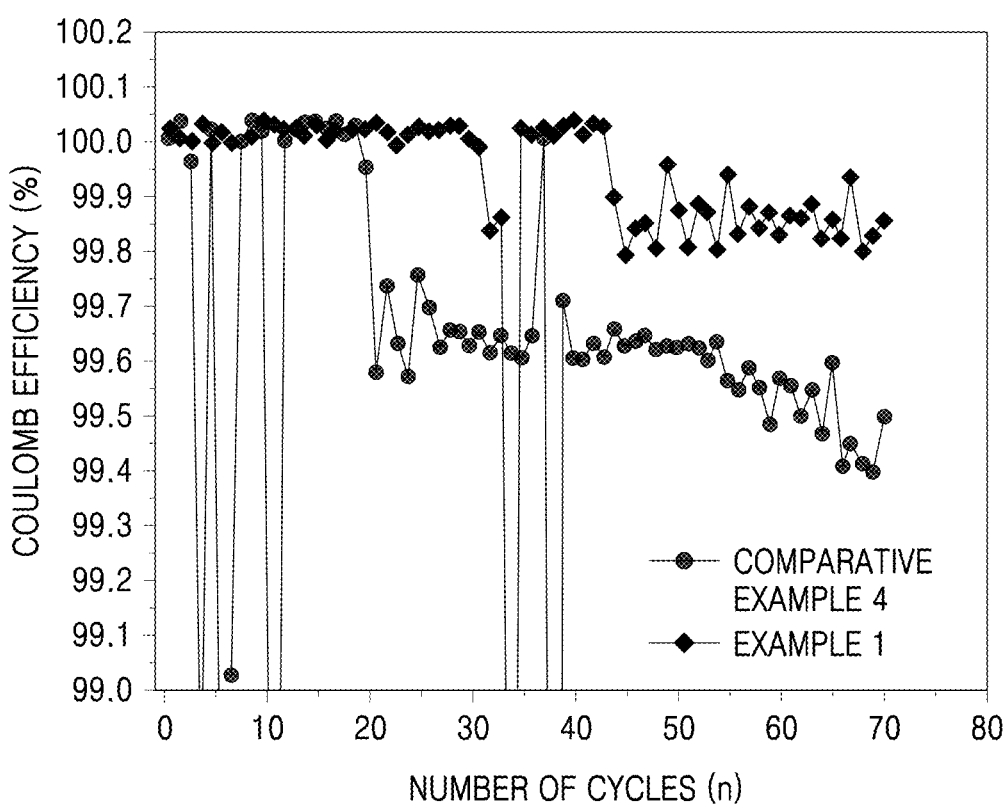
FIG. 11 is a graph of coulombic efficiency (percent, %) vs. number of cycles (n) of all-solid-state secondary batteries prepared according to Example 1 and Comparative Example 4.

After repeating the cycle for a total of 70 times, changes in the discharge capacity and the Coulomb efficiency were investigated, and results are shown in FIGS. 10 and 11.

Referring to FIG. 10, it was confirmed that the all-solid-state secondary battery of Example 1 had an improved discharge capacity retention rate compared to the all-solid-state secondary battery of Comparative Example 4. In addition, the all-solid-state secondary battery of Example 1 had significantly improved Coulomb efficiency compared to the case of Comparative Example 4, as shown in FIG. 11.

As described, according to the one or more embodiments, a secondary battery with improved lifespan and high-rate characteristics may be prepared by suppressing growth of lithium dendrites, stably maintaining the interface, and suppressing a phenomenon of metal diffusion in an electrode during charge and discharge at high temperatures.

It should be understood that embodiments described herein should be considered in a descriptive sense only and not for purposes of limitation. Descriptions of features or aspects within each embodiment should be considered as available for other similar features or aspects in one or more embodiments. While one or more embodiments have been described with reference to the figures, it will be understood by those of ordinary skill in the art that various changes in form and details may be made therein without departing from the spirit and scope as defined by the following claims.

What is claimed is:

1. An anode interlayer comprising a composite, the composite comprising:

a first metal having electrochemical reactivity to lithium and a second metal having no electrochemical reactivity to lithium, wherein the second metal has a non-spherical structure, and the first metal is disposed on at least one surface of the second metal, wherein the first metal is silver, gold, silicon, tin, germanium, magnesium, aluminum, antimony, bismuth, or a combination thereof, wherein the first metal has a particle size that is less than a particle size of the second metal, and wherein a coverage of the first metal on the second metal is about 5% to about 20%, wherein the coverage is a percentage of a total surface area of the second metal occupied by the first metal.

2. The anode interlayer of claim 1, wherein the first metal is in a form of a nanoparticle, a needle, a nanowire, a nanotube, a wafer, a nanoribbon, an ellipse, a polyhedron, or a combination thereof.

3. The anode interlayer of claim 1, wherein the second metal is in a form of a needle, a nanowire, a nanotube, a nanorod, a wafer, a nanoribbon, a nanofiber, an ellipse, a polyhedron, or a combination thereof.

4. The anode interlayer of claim 1, wherein an aspect ratio of the second metal is greater than an aspect ratio of the first metal, and a ratio of the aspect ratio of the first metal to the aspect ratio of the second metal is in a range of about 1:20 to about 1:200.

5. The anode interlayer of claim 1, wherein the first metal has a face-centered cubic crystal structure.

6. The anode interlayer of claim 1, wherein a reduction voltage of the first metal is greater than a reduction voltage of the second metal, the first metal has a reduction voltage in a range of about 0.7 volts versus standard hydrogen electrode to about 0.9 volts versus standard hydrogen electrode, and the first metal undergoes a galvanic replacement reaction under the reduction voltage condition of the second metal.

7. The anode interlayer of claim 1, wherein a weight ratio of the first metal to the second metal is in a range of about 1:2 to about 1:10.

8. The anode interlayer of claim 1, wherein the second metal is copper, nickel, titanium, tungsten, iron, or a combination thereof.

9. The anode interlayer of claim 1, wherein the composite further comprises a carbonaceous material.

10. The anode interlayer of claim 9, wherein the carbonaceous material comprises amorphous carbon.

11. The anode interlayer of claim 1, wherein the composite comprises the first metal and the second metal, wherein the first metal is in a form of a needle, a nanoparticle, a nanorod, or a combination thereof, and is disposed on the second metal, wherein the second metal is in a form of a nanowire, a nanorod, a needle, or a combination thereof.

12. The anode interlayer of claim 1, wherein the first metal and the second metal each have an electronic conductivity of about $1 \times 10^7$ Siemens per centimeter or more.

13. An anode interlayer comprising a composite, the composite comprising:

a first metal having electrochemical reactivity to lithium and a second metal having no electrochemical reactivity to lithium, wherein the first metal has a face-centered cubic crystal structure and is silver, gold, silicon, germanium, aluminum, bismuth, or a combination thereof, and the second metal has a non-spherical structure, wherein the first metal is disposed on at least a one surface of the second metal, and wherein the first metal has an aspect ratio that is the same as or less than an aspect ratio of the second metal.

14. An anode for secondary battery comprising:

an anode current collector; and the anode interlayer of claim 1 on the anode current collector.

15. The anode of claim 14, further comprising a first anode active material layer between the anode current collector and the anode interlayer.

16. The anode of claim 15, wherein the first anode active material layer comprises a lithium metal, a lithium alloy, or a combination thereof.

17. A secondary battery comprising:

a cathode layer comprising a cathode active material;

an anode layer; and a solid electrolyte layer comprising a solid electrolyte and disposed between the cathode layer and the anode layer, wherein the anode layer comprises the anode of claim 14.

18. The secondary battery of claim 17, wherein, after charge and discharge of the secondary battery, the first metal is uniformly present in an entire region of the anode interlayer.

19. The secondary battery of claim 17, wherein the anode current collector, the anode interlayer, and a region therebetween are lithium-free regions that do not comprise lithium in an initial state or a post-discharge state of the secondary battery.

20. The secondary battery of claim 17, further comprising a first anode active material layer between the anode current collector and the anode interlayer.

21. The secondary battery of claim 20, wherein the first anode active material layer comprises a lithium metal, a lithium alloy, or a combination thereof.

22. The secondary battery of claim 17, wherein the solid electrolyte comprises an oxide electrolyte, a sulfide electrolyte, a polymer electrolyte, or a combination thereof.

23. The secondary battery of claim 22, wherein the oxide solid electrolyte comprises $Li_{1+x+y}Al_xTi_{2-x}Si_yP_{3-y}O_{12}$ wherein $0<x<2$, and $0 \leq y<3$, $BaTiO_3$, $Pb(Zr_{1-y}Ti_y)O_3$ wherein $0 \leq y \leq 1$, $Pb_{1-x}La_xZr_{1-y}Ti_yO_3$ wherein $0<x<1$, and $0 \leq y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ wherein $0<x \leq 2$, and $0<y \leq 3$, $Li_xAl_yTi_z(PO_4)_3$ wherein $0<x \leq 2$, $0<y \leq 1$, and $0<z \leq 3$, $Li_{1+x+y}(Al_{1-z}Ga_z)_x(Ti_{1-p}Ge_p)_{2-x}Si_yP_{3-y}O_{12}$ wherein $0 \leq x \leq 1$, $0 \leq y \leq 1$, $0 \leq z \leq 1$, and $0 \leq p \leq 1$, $Li_xLa_yTiO_3$ wherein $0<x \leq 2$, and $0<y \leq 3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ wherein M is tellurium, niobium, or zirconium, and x is an integer from 1 to 10, or a combination thereof.

24. The secondary battery of claim 22, wherein the sulfide solid electrolyte comprises $Li_2S$—$P_2S_5$, $Li_2S$—$P_2S_5$—$LiX$ wherein X is a halogen atom, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ wherein m and n are each a positive number, and Z is one of germanium, zinc, or gallium, $Li_2S$—$GeS_2$, $Li_2S$—$SiS_2$—$Li_3PO_4$, $Li_2S$—$SiS_2$—$Li_pMO_q$ wherein p and q are each a positive number, and Mis phosphorus, silicon, germanium, boron, aluminum, gallium, or indium, $Li_{7-x}PS_{6-x}Cl_x$ wherein $0 \leq x \leq 2$, $Li_{7-x}PS_{6-x}Br_x$ wherein $0 \leq x \leq 2$, $Li_{7-x}PS_{6-x}I_x$ wherein $0 \leq x \leq 2$, or a combination thereof.

25. The secondary battery of claim 17, wherein the secondary battery is an all-solid-state secondary battery.

26. A method of preparing an anode interlayer, the method comprising:

providing a first metal having electrochemical reactivity to lithium;

providing a second metal having no electrochemical reactivity to lithium, wherein the second metal is in a form of a non-spherical structure;

disposing the first metal on at least one surface of the second metal to prepare a composite;

contacting the composite with a binder and a solvent to form a slurry, coating the slurry on a substrate to form a coated substrate;

drying the coated substrate; and removing the substrate to prepare the anode interlayer, wherein the first metal is silver, gold, silicon, tin, germanium, magnesium, aluminum, antimony, bismuth, or a combination thereof, wherein the first metal has a particle size that is less than a particle size of the second metal, and wherein a coverage of the first metal on the second metal is about 5% to about 20%, wherein the coverage is a percentage of a total surface area of the second metal occupied by the first metal.

27. The method of claim 26, further comprising contacting the composite with a carbonaceous material after the disposing of the first metal on the at least one surface of the second metal.

28. The method of claim 27, wherein the disposing of the first metal on the at least one surface of the second metal to form the composite comprises contacting the second metal with an electrolytic solution containing a first metal precursor, and reducing the first metal precursor on a surface of the second metal to form the composite.

29. The method of claim 28, wherein the reducing of the first metal precursor on the surface of the second metal comprises a galvanic replacement reaction.

30. The method of claim 26, wherein the disposing of the first metal on the at least one surface of the second metal to provide the composite further comprises ultrasonicating a mixture of the composite in an alcohol solvent, water, or a combination thereof, and vacuum-drying the mixture to form a washed composite.

31. The method of claim 30, wherein the mixture is a dispersion of the mixture of the composite in the alcohol solvent, water, or a combination thereof.

32. A method of preparing an anode active material layer, the method comprising:

providing a battery comprising a cathode layer comprising a cathode active material, an anode layer; and

a solid electrolyte layer comprising a solid electrolyte and disposed between the cathode layer and the anode layer, wherein the anode layer comprises the anode of claim 14; and charging the battery to precipitate an anode active material layer between the anode current collector and the anode interlayer, to prepare the anode active material layer.

\* \* \* \* \*

28